(12) United States Patent
Liu

(10) Patent No.: US 8,933,897 B2
(45) Date of Patent: Jan. 13, 2015

(54) DUAL-MODE TOUCH SENSING APPARATUS AND METHOD THEREOF

(76) Inventor: Hung-Ta Liu, Zhubei (TW)

( * ) Notice: Subject to any disclaimer, the term of this patent is extended or adjusted under 35 U.S.C. 154(b) by 240 days.

(21) Appl. No.: 13/328,067

(22) Filed: Dec. 16, 2011

(65) Prior Publication Data

US 2012/0154326 A1    Jun. 21, 2012

(30) Foreign Application Priority Data

Dec. 16, 2010    (TW) ................ 99144256 A

(51) Int. Cl.
*G06F 3/041*    (2006.01)
*G06F 3/044*    (2006.01)
*G06F 3/046*    (2006.01)

(52) U.S. Cl.
CPC .............. *G06F 3/044* (2013.01); *G06F 3/0412* (2013.01); *G06F 3/046* (2013.01); *G06F 2203/04106* (2013.01)
USPC ...... 345/173; 345/174; 178/18.06; 178/18.07

(58) Field of Classification Search
CPC ......... G06F 3/044; G06F 3/046; G06F 3/047; G06F 3/0412
USPC ............. 345/173, 179, 174; 178/18.06, 18.07
See application file for complete search history.

(56) References Cited

U.S. PATENT DOCUMENTS

| 5,606,346 | A | * | 2/1997 | Kai et al. | 345/173 |
|---|---|---|---|---|---|
| 5,894,304 | A | * | 4/1999 | Hirano | 345/179 |
| 6,417,846 | B1 | | 7/2002 | Lee | |
| 6,424,398 | B1 | * | 7/2002 | Taniguchi | 349/143 |
| 8,243,027 | B2 | * | 8/2012 | Hotelling et al. | 345/173 |
| 8,259,086 | B2 | * | 9/2012 | Agari et al. | 345/173 |
| 8,514,189 | B2 | * | 8/2013 | Wu et al. | 345/173 |
| 8,552,989 | B2 | * | 10/2013 | Hotelling et al. | 345/173 |
| 2004/0105040 | A1 | | 6/2004 | Oh et al. | |
| 2006/0017710 | A1 | | 1/2006 | Lee et al. | |
| 2006/0238487 | A1 | * | 10/2006 | Shih | 345/102 |
| 2006/0256093 | A1 | * | 11/2006 | Furukawa et al. | 345/173 |
| 2007/0002009 | A1 | | 1/2007 | Pasch et al. | |
| 2009/0021884 | A1 | | 1/2009 | Nakamura | |
| 2009/0267905 | A1 | * | 10/2009 | Hsu et al. | 345/173 |
| 2010/0013788 | A1 | | 1/2010 | Park et al. | |
| 2010/0045635 | A1 | * | 2/2010 | Soo | 345/178 |
| 2010/0123673 | A1 | | 5/2010 | Nam | |
| 2010/0214248 | A1 | * | 8/2010 | Takano et al. | 345/173 |
| 2010/0295819 | A1 | * | 11/2010 | Ozeki et al. | 345/174 |

(Continued)

FOREIGN PATENT DOCUMENTS

| CN | 1169557 A | 1/1998 |
|---|---|---|
| CN | 1591093 A | 3/2005 |

(Continued)

*Primary Examiner* — Dmitriy Bolotin
(74) *Attorney, Agent, or Firm* — The Webb Law Firm

(57) ABSTRACT

The present invention provides a dual-mode touch sensing apparatus. The apparatus includes a sensor, a first selective unit, a second selective unit, a first control unit, a second control unit, first conductive lines and second conductive lines. The first conductive lines are arranged in a first direction. Each first conductive line has a first end and a second end. The first end couples with the first control unit and the second end couples with the first selective unit. Second conductive lines are arranged in a second direction. Each second conductive line has a first end and a second end, the first end couples with the second control unit and the second end couples with the second selective unit.

21 Claims, 10 Drawing Sheets

(56) References Cited

U.S. PATENT DOCUMENTS

| | | | |
|---|---|---|---|
| 2010/0328249 A1* | 12/2010 | Ningrat et al. | 345/174 |
| 2010/0328336 A1* | 12/2010 | Si | 345/589 |
| 2011/0007013 A1* | 1/2011 | Shoji | 345/173 |
| 2011/0025635 A1* | 2/2011 | Lee | 345/173 |
| 2011/0096251 A1* | 4/2011 | Son et al. | 349/15 |
| 2011/0109568 A1* | 5/2011 | Wu et al. | 345/173 |
| 2011/0109622 A1* | 5/2011 | Son et al. | 345/419 |
| 2011/0157058 A1* | 6/2011 | Bita et al. | 345/173 |
| 2011/0205178 A1* | 8/2011 | Yoshida et al. | 345/173 |
| 2011/0227588 A1* | 9/2011 | Chen et al. | 324/654 |

FOREIGN PATENT DOCUMENTS

| | | |
|---|---|---|
| CN | 101019071 A | 8/2007 |
| CN | 101937296 A | 1/2011 |
| EP | 0250931 A2 | 1/1988 |
| EP | 2172834 A2 | 4/2010 |
| FR | 2934908 A1 | 2/2010 |
| JP | 3220405 B2 | 10/2001 |
| TW | 200506480 | 2/2005 |
| TW | 200533591 | 10/2005 |
| TW | 200624974 | 7/2006 |
| TW | 200627041 | 8/2006 |
| TW | 200939097 A | 9/2009 |
| TW | 201007090 A1 | 2/2010 |
| TW | 201017306 A1 | 5/2010 |
| TW | 201024203 A | 7/2010 |
| TW | 201044241 A1 | 12/2010 |
| TW | M393740 U1 | 12/2010 |

\* cited by examiner

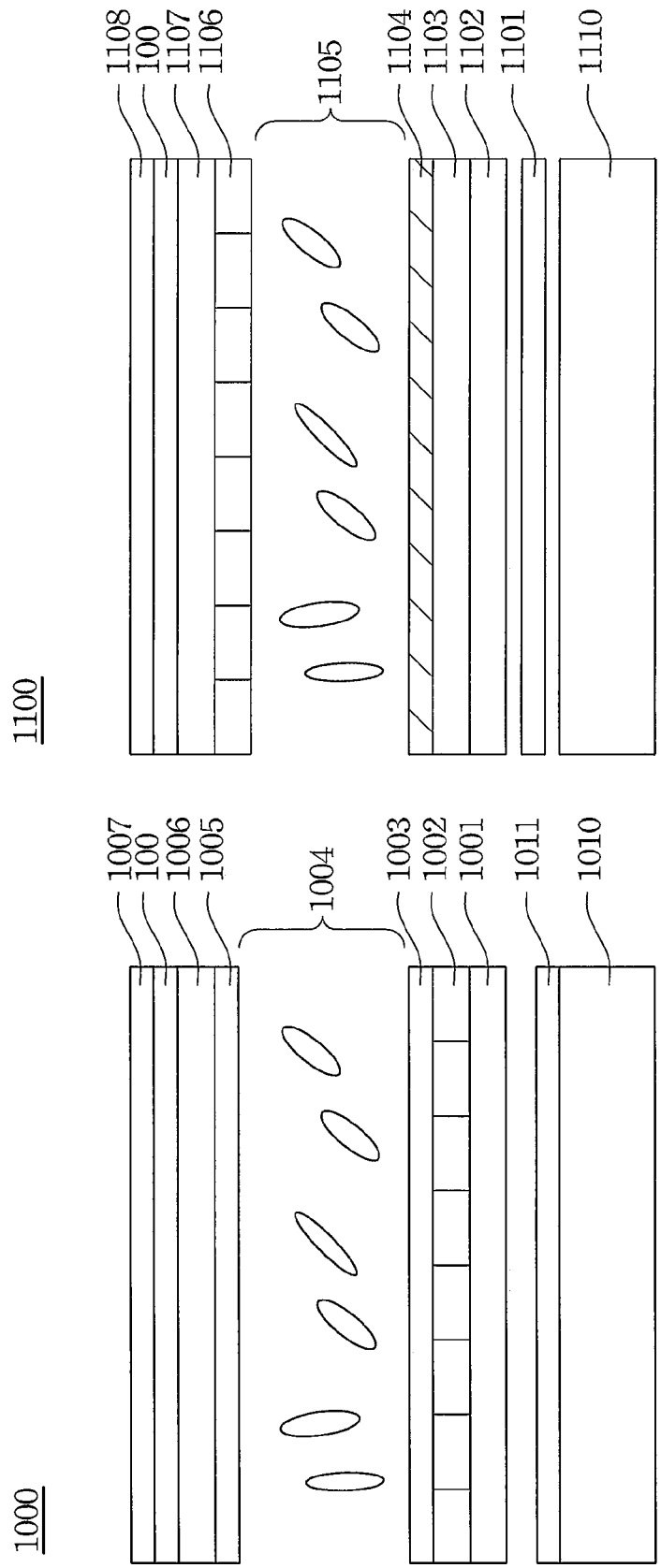

DUAL-MODE TOUCH SENSING APPARATUS AND METHOD THEREOF

RELATED APPLICATIONS

This application claims priority to Taiwan Provisional Application Serial Number 099144256, filed Dec. 16, 2010, which is herein incorporated by reference.

BACKGROUND

1. Field of Invention

The present invention relates to a touch sensor and driving method thereof, and more particularly to a dual-mode touch sensing apparatus and method thereof.

2. Description of Related Art

Regarding the developing of display technology, novel displays have been used in many types of portable device, such as a notebooks, a mobile phones, a digital camera and other electronic product. For avoiding these portable devices too heavy, the input apparatus have been changed from keyboards to touch panel.

Typically, three main sensing control technologies are used in touch panel including resistive touch sensing technology, electromagnetic touch sensing technology and capacitive touch sensing technology. According to the capacitive touch sensing technology, only one side of the insulator is coated with a conductive layer. A small voltage is applied to the layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel.

On the other hand, a sensor board using the electromagnetic sensing technology includes a substrate with an antenna array, a control circuit for calculating the touch position and a sensing pen. The sensing pen is a transceiver and the substrate with the antenna array is a receiver. When a user uses the sensing pen to touch the electronic paper display, magnetic flux is changed. A micro-controller can detect the change of the magnetic flux to calculate the touch position.

Typically, a touch panel using the capacitive touch sensing technology has those advantages including waterproof, anti scratch and high rate of transmission. Moreover, it is also very convenience for a user to use his finger to control this kind of touch panel. However, when a control point shown in the is touch panel is very smaller than the size of human finger, it is very possible to touch other control point to trigger an unwanted function while a user uses his finger to touch this control point. Therefore, a new touch panel design that can provides different sensing supports is required.

SUMMARY

An object of the present invention is to provide a dual-mode sensing apparatus can provide supports in both electromagnetic touch sensing technology and capacitive touch sensing technology.

The present invention provides a dual-mode touch sensing apparatus. The apparatus includes a sensor, a first selective unit, a second selective unit, a first control unit, a second control unit, first conductive lines and second conductive lines. The first conductive lines are arranged in a first direction. Each first conductive line has a first end and a second end. The first end couples with the first control unit and the second end couples with the first selective unit. Second conductive lines are arranged in a second direction. Each second conductive line has a first end and a second end, the first end couples with the second control unit and the second end couples with the second selective unit.

In an embodiment, when the dual-mode touch sensing apparatus performs an electromagnetic touch sensing technology, the first control unit connects the first end of each of the first conductive lines to a first transmission line and the first selective unit sequentially connects the second ends of the first conductive lines based on an order to form sensing loops in the first direction; the second control unit connects the first end of each of the second conductive lines to a second transmission line, the second selective unit sequentially connects the second end of the second conductive lines based on an order to form sensing loops in the second direction; and a first sensing method is performed to sense the magnetic flux, electromagnetic induction, current or frequency of sensing loops to determine, distance, height, strength, a touch position or a touch strength.

In an embodiment, further comprising: grouping the first conductive lines and the second conductive lines, wherein each group includes at least two first conductive lines, or at least two second conductive lines; the first selective unit sequentially connects the second ends of the first conductive lines in each group based on an order to form sensing loops in the first direction; the second selective unit sequentially connects the second end of the second conductive lines in each group based on an order to form sensing loops in the second direction; transferring a sensing signal to the sensing loops; and performing the first sensing method to sense the magnetic flux, electromagnetic induction, current or frequency of sensing loops to determine, distance, height, strength, a touch position or a touch strength.

In an embodiment, the first sensing method is to transfer a sensing signal with a special frequency to the sensing loops to sense the magnetic flux, electromagnetic induction, current or frequency of the sensing loops, wherein the sensor determine whether or not the magnetic flux, electromagnetic induction, current or frequency of the sensing loops are changed.

In an embodiment, when the dual-mode touch sensing apparatus performs a capacitive touch sensing technology, the first control unit disconnects the connection between the first end of each of the first conductive lines and a first transmission line, and the second control unit disconnects the connection between the first end of each of the second conductive lines and a second transmission line, and a second sensing method is performed to sense the capacitance, current or voltage to determine, distance, height, strength, a touch position or a touch strength.

In an embodiment, further comprising: grouping the first conductive lines and the second conductive lines, wherein each group includes at least two first conductive lines, or at least two second conductive lines; transferring a sensing signal to each group; and performing the second sensing method to sense the capacitance, current or voltage to determine a touch position or a touch strength of each group to determine, distance, height, strength, a touch position or a touch strength.

In an embodiment, the second sensing method is the sensor transfers a sensing signal through the first selective unit to the first conductive lines, and transfers a sensing signal through the second selective unit to the second conductive lines to sense the change of the capacitance, current or voltage of the first conductive lines and the second conductive lines to determine, distance, height, strength, a touch position or a touch strength.

In an embodiment, the second sensing method is the sensor transfers a sensing signal through the first selective unit to the first conductive lines, and through the second selective unit to sense the capacitance, current or voltage of the second conductive lines to determine, distance, height, strength, a touch position or a touch strength.

In an embodiment, the first control unit includes a control line and a plurality of switches or a plurality of switches in series coupling with the first conductive lines, wherein the sensor controls the control line to turn on the is switches to make the first end of each of the first conductive lines connect to a first transmission line, and the sensor controls the control line to turn off the switches to disconnect the connection between the first end of each of the first conductive lines and the first transmission line.

In an embodiment, the second control unit includes a control line and a plurality of switches or a plurality of switches in series coupling with the second conductive lines, wherein the sensor controls the control line to turn on the switches to make the first end of each of the second conductive lines connect to a second transmission line, and the sensor controls the control line to turn off the switches to disconnect the connection between the first end of each of the second conductive lines and the second transmission line.

In an embodiment, the first selective unit includes a plurality of switches coupling with the first conductive lines respectively, and the second selective unit includes a plurality of switches coupling with the second conductive lines respectively, wherein the sensor transfers the sensing signal to the loops through the first selective unit and the second selective unit to perform an electromagnetic touch sensing technology.

In an embodiment, the first selective unit and the second selective unit can be integrated into a gate driver, a source driver, a timing control IC or a sensor circuit in a display.

In an embodiment, the sensor has a first sensing circuit and a second sensing circuit, the first sensing circuit perform an electromagnetic touch sensing technology and the second sensing circuit perform an capacitive touch sensing technology.

The present invention also provides a display with a dual-mode touch sensing apparatus, further comprising: a first substrate with a pixel array; second substrate; a display unit located between the first substrate and the second substrate; and a common electrode layer. The dual-mode touch sensing apparatus. The apparatus includes a sensor, a first selective unit, a second selective unit, a first control unit, a second control unit, first conductive lines and second conductive lines. The first conductive lines are arranged in a first direction. Each first conductive line has a first end and a second end. The first end couples with the first control unit and the second end couples with the first selective unit. Second conductive lines are arranged in a second direction. Each second conductive line has a first end and a second end, the first end couples with the second control unit and the second end couples with the second selective unit.

In an embodiment, further comprising a cover lens located over the second substrate, wherein the dual-mode touch sensing apparatus is disposed inside or outside of the cover lens, or the dual-mode touch sensing apparatus is disposed between the cover lens and the second substrate.

In an embodiment, the first conductive lines and the second conductive lines includes the data lines, the scan lines, the power lines, the Bias lines, the common electrode lines, the reading lines and the control lines of the display.

In an embodiment, the first conductive lines and the second conductive lines includes at least one line that is designated by the data lines, the scan lines, the power lines, the Bias lines, the common electrode lines, the reading lines and the control lines of the display.

In an embodiment, the display is an Organic Light Emitting Display, a thin film transistor liquid crystal display, an Electrode Wetting display or an electrophoretic display.

In an embodiment, the pixel array is a transmissive-mode pixel array, a reflective-mode pixel array or a dual-mode transflective or partially reflective pixel array.

In an embodiment, the dual-mode touch sensing apparatus is disposed inside or outside of the second substrate, or the dual-mode touch sensing apparatus is disposed between the common electrode and the second substrate, or the dual-mode touch sensing apparatus is disposed on the first substrate.

In an embodiment, the common electrode is disposed on the first substrate, the pixel array is an IPS (In plan Switching) pixel structure or a FFS (Fringe Field Switching) pixel structure.

In an embodiment, the common electrode is disposed on the second substrate, the pixel array is a Slit ITO pixel structure.

In an embodiment, the display further comprises a backlight module, the dual-mode touch sensing apparatus is operated when the backlight module is turned off or turned dark.

In an embodiment, the display further comprises a backlight module, the display is divided into a plurality of regions to display an image, when one of the regions whose backlight module is turned off or turned dark, the dual-mode touch sensing apparatus is operated in this region.

Accordingly, the dual-mode touch sensor of the present invention provides two types of sensing technology, the electromagnetic touch sensing technology and the capacitive touch sensing technology, to determine the touch position. In the electromagnetic touch sensing technology, a user can use a pen with a magnetic sensing loop or a LC loop to write. In the capacitive touch sensing technology, a user can use his finger to write. That is, the present invention provides different input interface to the user to increase the input convenience. Moreover, the data lines and the scan lines can be used to serve as the electrode of the dual-mode touch sensor of the present invention. Accordingly, it is not necessary to form additional electrodes for sensing the touch position. Therefore, the production cost is reduced and the production yield is kept.

BRIEF DESCRIPTION OF THE DRAWINGS

In order to make the foregoing as well as other aspects, features, advantages, and embodiments of the present invention more apparent, the accompanying drawings are described as follows:

FIG. 10 illustrates a cross section view of a liquid crystal display with the dual-mode touch sensor according to an embodiment of the present invention.

FIG. 11 illustrates a cross section view of a liquid crystal display with the dual-mode touch sensor according to another embodiment of the present invention.

DETAILED DESCRIPTION

Figure 1A:
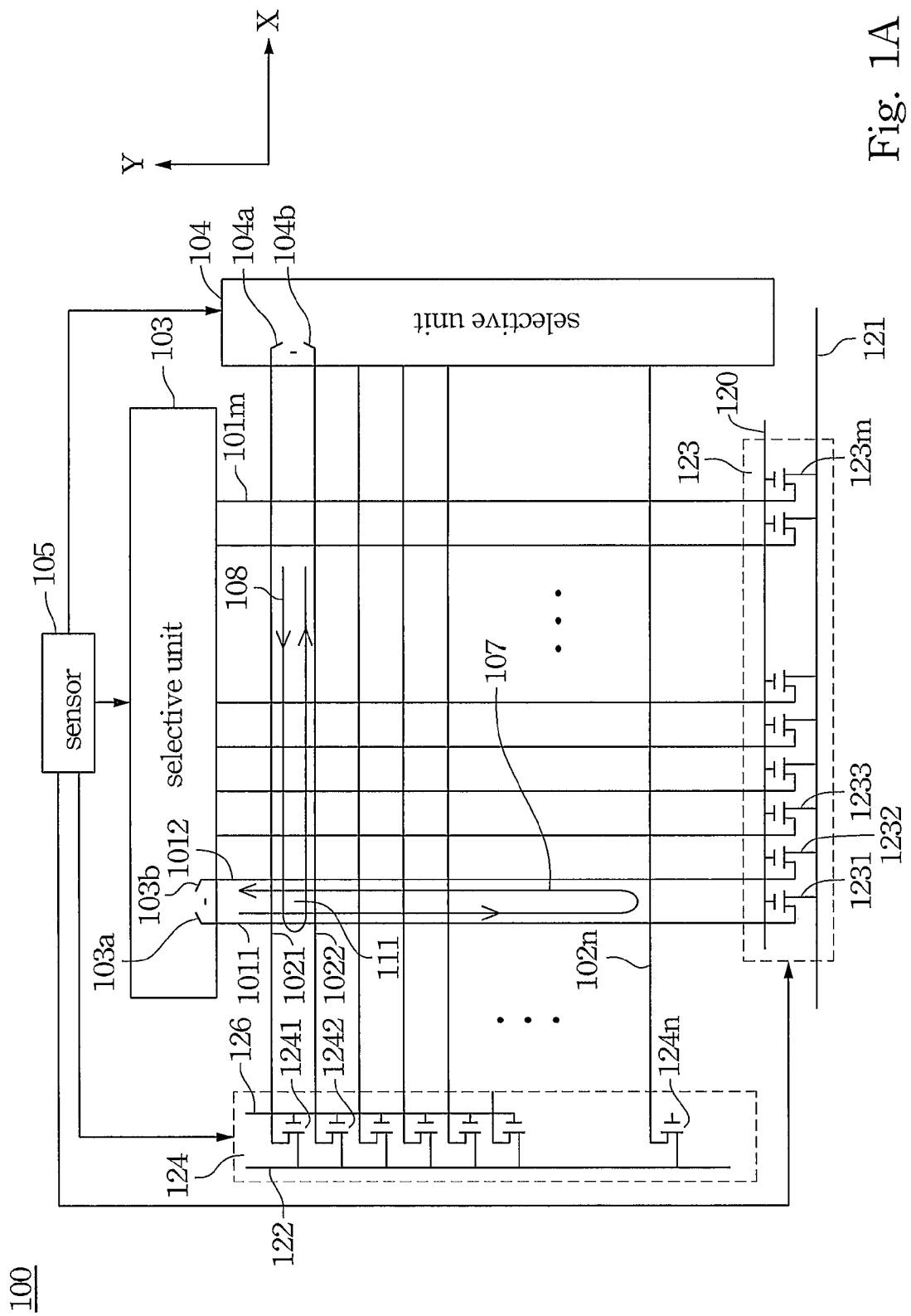
FIG. 1A illustrates a schematic diagram of an electrode structure of a dual-mode touch sensor according to a preferred embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1A illustrates a schematic diagram of an electrode structure of a dual-mode touch sensor according to a preferred embodiment of the present invention. The electrode structure can provide supports in both electromagnetic touch sensing technology and capacitive touch sensing technology. The electrode structure of a dual-mode touch sensor 100 of the present invention is formed in a substrate. The electrode structure includes a plurality of first conductive line 1011~101m arranged in a first direction, such as Y direction, and a plurality of second conductive line 1021~102n arranged in a second direction, such as X direction. The first conductive lines 1011~101m cross the second conductive lines 1021~102n. The first conductive lines 1011~101m and the second conductive lines 1021~102n are formed in different layers that are separated by an insulation layer over the substrate. Two adjacent first conductive lines, such as the first conductive lines 1011 and 1012, and two adjacent second conductive lines, such as the second conductive lines 1021 and 1022, define a sensing region 111. In an embodiment, the first direction and the second direction have an included angle of 90 degrees. However, in another embodiments, the first direction and the second direction can have another included angle, such as 60 degrees, 45 degrees, 36 degrees or 30 degrees. The material for forming the first conductive lines 1011~101m and the second conductive lines 1021~102n is metal, compound metal, Carbon Nanotubes, transparent conductor material, such as ITO, IZO.

One side of the first conductive lines 1011~101m is coupled with a selective unit 102. The other side of the first conductive lines 1011~101m is coupled with a control unit 123. The control unit 123 controls the connection among the first conductive lines 1011~101m. The control unit 123 includes a control line 120, a plurality of switch 1231~123m and a transmission line 121. A sensor 105 controls the control line 120 to switch the switches 1231~123m. The first conductive lines 1011~101m are connected to the transmission line 121 through the switches 1231~123m. Therefore, the first conductive lines 1011~101m can be connected together through the transmission line 121. In an embodiment, the switches 1231~123m are thin film transistors (TFT). The gate electrodes of the TFTs are connected to the control line 120. When the control line 120 controls the TFTs to an off state, the connection between the first conductive lines 1011~101m and the transmission line 121 is disconnected. When the control line 120 controls the TFTs to an on state, the selective unit 103 selects some of the first conductive lines 1011~101m to connect with the transmission line 121 in the control unit 123 and the sensor 105 to form a sensing loop.

On the other hand, one side of the second conductive lines 1021~102n is coupled with a selective unit 104. The other side of the second conductive lines 1021~102n is coupled with a control unit 124. The control unit 124 controls the connection among the second conductive lines 1021~102n. The control unit 124 includes a control line 126, a plurality of switch 1241~124n and a transmission line 122. A sensor 105 controls the control line 126 to switch the switches 1241~124n. The second conductive lines 1021~102n are connected to the transmission line 122 through the switches 1241~124n. Therefore, the second conductive lines 1021~102n can be connected together through the transmission line 122. In an embodiment, the switches 1241~124n are thin film transistors (TFT). The gate electrodes of the TFTs are connected to the control line 126. When the control line 126 controls the TFTs to an off state, the connection between the second conductive lines 1021~102n and the transmission line 122 is disconnected. When the control line 126 controls the TFTs to an on state, the selective unit 104 selects some of the second conductive lines 1021~102n to connect with the transmission line 122 in the control unit 124 and the sensor 105 to form a sensing loop. The sensor 105 can be integrated into the selective unit 103 or the selective unit 104. Or, the sensor 105 can be a device independent from the selective unit 103 and the selective unit 104.

The sensor 105 has dual-mode functions for providing supports in both electromagnetic touch sensing technology and capacitive touch sensing technology to calculate the position and height. In an embodiment, the sensor 105 has a first sensing integrated circuit and a second sensing integrated circuit. The first sensing integrated circuit provides support in the capacitive touch sensing technology to calculate the position and height. The second sensing integrated circuit provides support in the electromagnetic touch sensing technology to calculate the position and height. The sensor 105 can provide an exciting signal or a detecting signal to sense the signal in some of the first conductive lines 1011~101m that are selected by the selective unit 103 and provide an exciting signal or a detecting signal to sense the signal in some of the second conductive lines 1021~102n that are selected by the selective unit 104.

In an embodiment, the selective unit 103 includes a plurality of switches connected to corresponding first conductive lines 1011~101m. The switches are selected to connect some of the first conductive lines 1011~101m to form a sensing loop. For example, the switch 103a connects with the first conductive line 1011. The switch 103b connects with the first conductive line 1012. When the switch 103a and the switch 103b are selected, the first conductive line 1011 and the first conductive line 1012 are connected together to form a sensing loop 107. At this time, when the electromagnetic touch sensing technology is performed, the sensor 105 sends a sensing signal through the switch 103a in the selective unit 103 to the sensing loop 107 and receives the sensing signal through the switch 103b in the selective unit 103 to determine whether or not a touching event happens in the sensing loop 107.

On the other hand, the selective unit 104 also includes a plurality of switches connected to corresponding second conductive lines 1021~102n. The switches are selected to connect some of the second conductive lines 1021~102n to form a sensing loop. For example, the switch 104a connects with the second conductive line 1021. The switch 104b connects with the second conductive line 1022. When the switch 104a and the switch 104b are selected, the second conductive line 1021 and the second conductive line 1022 are connected together to form a sensing loop 108. At this time, when the electromagnetic touch sensing technology is performed, the sensor 105 sends a sensing signal through the switch 104a in the selective unit 104 to the sensing loop 108 and receives the sensing signal through the switch 104b in the selective unit 104 to determine whether or not a touching event happens in the sensing loop 108. In an embodiment, the switches 103a, 103b, 104a and 104b are thin film transistors or other devices with the same function as the thin film transistors.

It is noticed that, in the above embodiment, the claimed invention is to sense the sensing loops formed by connecting two adjacent first conductive lines 1011 and 1012 and formed by connecting two adjacent second conductive lines 1021 and 1022. However, in another embodiments, the claimed invention also can be used in sensing the sensing loops formed by connecting two separated first conductive lines, such as the first conductive lines 1011 and 1013, and formed by connecting two separated second conductive lines, such as the second conductive lines 1021 and 1023. Furthermore, the claimed invention also can be used in sensing the sensing loops that has a first main line and a second main line connected with the first main line, wherein the first main line and the second main line are formed by connecting some first conductive lines respectively.

For example, the switches connected to the first conductive lines 1011, 1012 and 1013 are turned on. Therefore, the first conductive lines 1011, 1012 and 1013 are connected together through the transmission line 121 to be the first main line. On the other hand, the switches connected to the first conductive lines 1017, 1018 and 1019 are turned on. Therefore, the first conductive lines 1017, 1018 and 1019 are connected together through the transmission line 121 to be the second main line. Then, the first main line and the second main line are connected together to form a sensing loop. In this embodiment, when the electromagnetic touch sensing technology is performed, the sensor 105 sends a sensing signal through the selective unit 103 to the first conductive lines 1011, 1012 and 1013 and receives the sensing signal through the first conductive lines 1017, 1018 and 1019 to determine whether or not a touching event happens in the sensing loop. The sensing loops can be formed sequentially or formed at the same time. The sensing loops can overlap to one another to prevent a "sensing miss" case. For example, a sensing loop A and a sensing loop B are formed sequentially. Part of the sensing loop A overlaps the sensing loop B to prevent a "sensing miss" case.

Accordingly, when the electromagnetic touch sensing technology is performed by the dual-mode touch sensing device 100, the sensor 105 controls the control units 123 and 124 to connect the first conductive lines 1011~101m and the second conductive lines 1021~102n respectively. The sensor 105 also controls the selective unit 103 to switch switches to form sensing loops among the first conductive lines 1011~101m and controls the selective unit 104 to switch switches to form sensing loops among the second conductive lines 1021~102n to sense the touch position. For example, a user touches the position 111. At this time, the sensor 105 controls the control unit 123 to connect the first conductive lines 1011~101m and controls the control unit 124 to connect the second conductive lines 1021~102n. Then, the sensor 105 also controls the selective unit 103 to switch switches to form sensing loops among the first conductive lines 1011~101m and controls the selective unit 104 to switch switches to form sensing loops among the second conductive lines 1021~102n to sense the touch position 111. In this embodiment, the sensor 105 senses the magnetic flux, electromagnetic induction, current or frequency of each sensing loop to determine the touch position. For example, the sensor 105 turns on the switches 1231~123m through the control line 120 to connect the first conductive lines 1011~101m to the transmission line 121 and turns on the switches 1241~124n through the control line 126 to connect the second conductive lines 1021~102n to the transmission line 122. Then, the sensor 105 also controls the selective unit 103 to switch switches to form sensing loops among the first conductive lines 1011~101m and controls the selective unit 104 to switch switches to form sensing loops among the second conductive lines. At this time, the sensor 105 sends a sensing signal to sensing loops and receives a signal from the sensing loop. Then, the sensor 105 can determine whether or not the magnetic flux, electromagnetic induction, current or frequency is changed based on the sensing signal whether or not is changed. In an embodiment, the sensing signal is a square wave signal, a triangle wave signal, a like-triangle wave signal or a wave signal composed of a plurality of square wave signals. The change of the sensing signal includes the distorted of the wave, the change of the average value of the signal, the change of the peak value of the signal, the change of the current or the change of the voltage.

For example, when a user touches the position 111, the magnetic flux, electromagnetic induction, current or frequency of the sensing loop 107 and sensing loop 108 is changed. Such change changes the sensing signal in the sensing loop 107 and sensing loop 108. When the sensor 104 senses this change of the sensing signal, the sensor can determine that the overlap region between the sensing loop 107 and sensing loop 108, position 111, is the touching position of the user. According to the present invention, the sensing loops are formed first by the selective units 103 and 104. Then, the sensor 105 senses the sensing loops to determine the touch position. Accordingly, when the sensing loops are formed sequentially, the sensor 105 senses the sensing loops sequentially. On the other hand, when the sensing loops are formed together, the sensor 105 senses the sensing loops at the same time.

On the other hand, when the capacitive touch sensing technology is performed by the dual-mode touch sensing device 100, the sensor 105 controls the control unit 123 to disconnect the connection among the first conductive lines 1011~101m and controls the control unit 124 to disconnect the connection among the second conductive lines 1021~102n. Next, the sensor 105 senses the touch position. Typically, there are two types of the capacitive touch sensing technology. One is self-capacitance touch sensing technology. The other is Mutual-capacitance touch sensing technology. According to the self-capacitance touch sensing technology, the sensor 105 senses the capacitance generated between the first conductive lines 1011~101m and the ground and between the second conductive lines 1021~102n and the ground to determine the touch position. Therefore, when a finger of a user touches a position, charges located in this position are moved from the first conductive lines 1011~101m or the second conductive lines 1021~102n to the finger of the user, which changes the capacitance in this position. In this case, the sensor 105 can sense this change of the capacitance in this position to determine the position. Accordingly, when the self-capacitance touch sensing technology is performed, the sensor 105 sends sensing signal to the first conductive lines 1011~101m and the second conductive lines 1021'~102n to determine the position whose capacitance is changed. Then, the sensor 105 can calculate the touching position based on the change of the capacitance.

On the other hand, according to the mutual-capacitance touch sensing technology, the sensor 105 senses the capacitance generated between the first conductive lines 1011~101m and the second conductive lines 1021~102n to determine the touch position. That is, the first conductive line and the second conductive line are the two electrodes of a capacitor. Therefore, when a finger of a user touches a position, charges located in this position are moved from the first conductive lines 1011~101m or the second conductive lines 1021~102n to the finger of the user, which changes the capacitance in this position. In this case, the sensor 105 can sense this change of the capacitance in this position to determine the position. Accordingly, when the mutual-capacitance touch sensing technology is performed to sense the touch position, the sensor 105 sends sensing signal to the first conductive lines 1011~101m and receives the sensing signal from the second conductive lines 1021~102n, or the sensor 105 sends sensing signal to the second conductive lines 1021~102n and receives the sensing signal from the first conductive lines 1011~101m to determine the position whose capacitance is changed. Then, the sensor 105 can calculate the touching position based on the change of the capacitance.

Figure 1B:
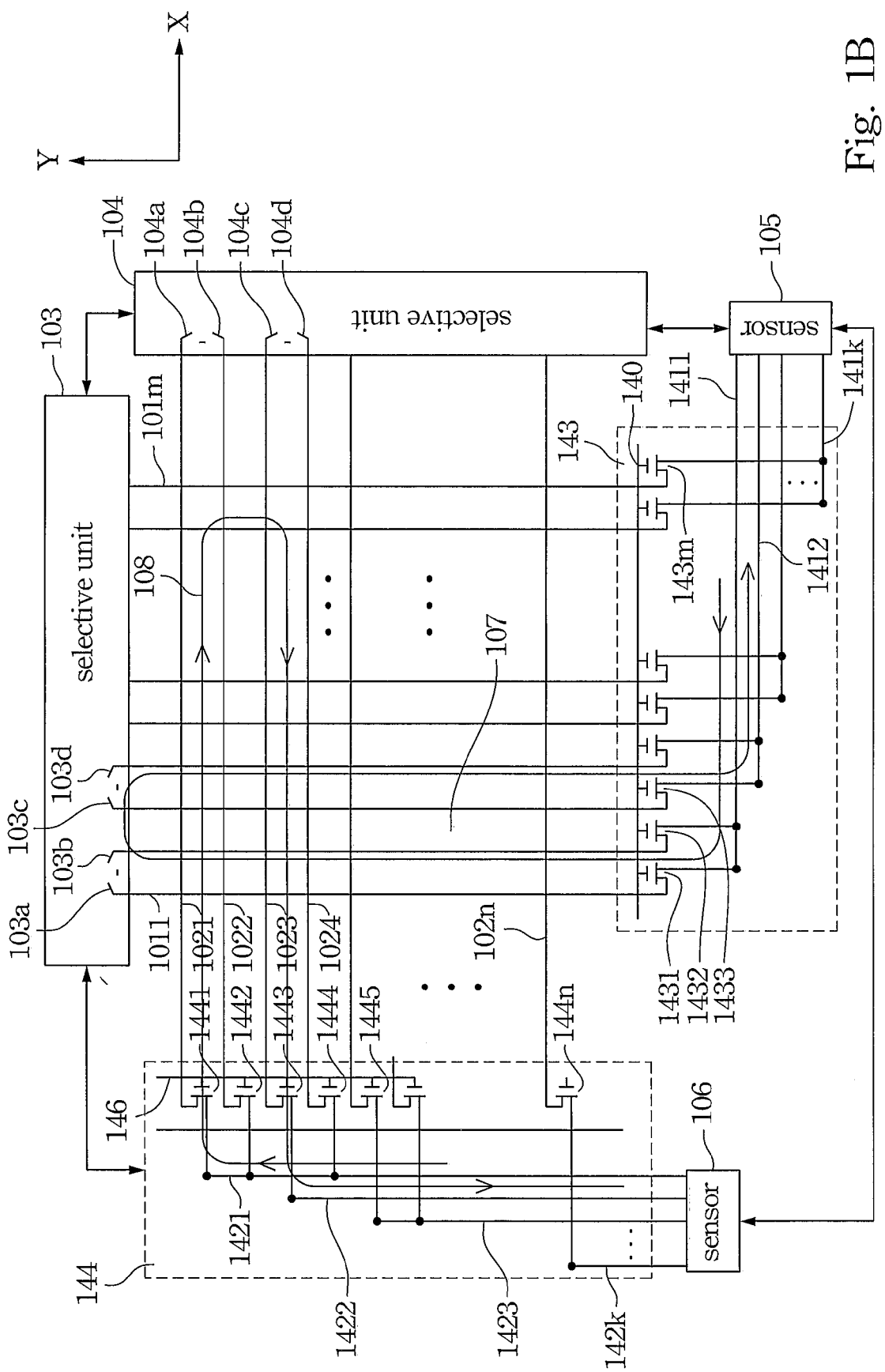
FIG. 1B illustrates a schematic diagram of an electrode structure of a dual-mode touch sensor according to another preferred embodiment of the present invention.

FIG. 1B illustrates a schematic diagram of an electrode structure of a dual-mode touch sensor according to another preferred embodiment of the present invention. In this embodiment, the sensor 105 connects with the transmission line. The selective units 103 and 104 are controlled by the sensor 105 to select the first conductive lines 1011~101m and the second conductive lines 1021~102n to form sensing loops. The control unit 143 includes a control line 140, a plurality of switch 1431~143m and a plurality of transmission line 1411~141k. A sensor 105 connects with the transmission lines 1411~141k. The first conductive lines 1011~101m are connected to corresponding transmission lines 1411~141k through the switches 1431~143m. Therefore, the first conductive lines 1011~101m can be connected to the sensor 105 through corresponding transmission lines 1411~141k. In this embodiment, the first conductive lines 1011 and 1012 are connected to the transmission line 1411 through the switches 1431 and 1432. The first conductive lines 1011 and 1012 are connected to the sensor 105 through the transmission line 1411. It is noticed that the number and order of the first conductive lines connected to each transmission line is not limited by this embodiment. For example, the first conductive lines 1011 and 1014 are connected to the transmission line 1411 through the switches 1431 and 1434. The first conductive lines 1012 and 1013 are connected to the transmission line 1411 through the switches 1432 and 1433.

A sensor 105 controls the control line 140 to switch the switches 1431~143m. The first conductive lines 1011~101m are connected to corresponding transmission lines through the switches 1431~143m. In an embodiment, the switches 1431~143m are thin film transistors (TFT). The gate electrodes of the TFTs are connected to the control line 140. When the control line 140 controls the TFTs to an off state, the connection between the first conductive lines 1011~101m and the transmission lines 1411~141k is disconnected. When the control line 120 controls the TFTs to an on state, the selective unit 103 selects some of the first conductive lines 1011~101m to connect with corresponding transmission line to form a sensing loop.

For example, when the electromagnetic touch sensing technology is performed by the dual-mode touch sensing device, the sensor 105 controls the control line 140 to turn on the switches 1431~143m and the sensor 105 also controls the selective unit 103 to turn on switches 103a, 103b, 103c and 103d to connect the first conductive lines 1011 and 1012 and the first conductive lines 1013 and 1014. Accordingly, the sensor 105 sends sensing signal to the first conductive lines 1011 and 1012 and receives the sensing signal from the transmission line 1412 through the first conductive lines 1013 and 1014 to determine the touch position.

On the other hand, the control unit 144 includes a control line 146, a plurality of switch 1441~144n and a plurality of transmission line 1421~142k. A sensor 106 connects with the transmission lines 1421~142k. The second conductive lines 1021~102n are connected to corresponding transmission lines 1441~144k through the switches 1441~144n. Therefore, the second conductive lines 1021~102n can be connected to the sensor 106 through corresponding transmission lines 1421~142k. In this embodiment, the second conductive lines 1023 and 1024 are connected to the transmission line 1422 through the switches 1443 and 1444. The second conductive lines 1023 and 1024 are connected to the sensor 106 through the transmission line 1422. It is noticed that the number and order of the second conductive lines connected to each transmission line is not limited by this embodiment. For example, the second conductive lines 1021 and 1024 are connected to the transmission line 1421 through the switches 1441 and 1444. The first conductive lines 1022 and 1023 are connected to the transmission line 1422 through the switches 1442 and 1443.

A sensor 106 controls the control line 146 to switch the switches 1441~144n. The second conductive lines 1021~102n are connected to corresponding transmission lines through the switches 1441~144b. In an embodiment, the switches 1441~144n are thin film transistors (TFT). The gate electrodes of the TFTs are connected to the control line 146. When the control line 146 controls the TFTs to an off state, the connection between the second conductive lines 1021~102n and the transmission lines 1421~142k is disconnected. When the control line 126 controls the TFTs to an on state, the selective unit 103 selects some of the second conductive lines 1021~102n to connect with corresponding transmission line to form a sensing loop.

For example, when the electromagnetic touch sensing technology is performed by the dual-mode touch sensing device, the sensor 106 controls the control line 146 to turn on the switches 1441~144n and the sensor 106 also controls the selective unit 104 to turn on switches 104a, 104b, 104c and 104d to connect the second conductive lines 1021 and 1022 and the second conductive lines 1023 and 1024. Accordingly, the sensor 106 sends sensing signal to the second conductive lines 1021 and 1022 and receives the sensing signal from the transmission line 1421 through the second conductive lines 1023 and 1024 to determine the touch position.

On the other hand, when the capacitive touch sensing technology is performed by the dual-mode touch sensing device, the sensor 105 controls the control unit 143 to disconnect the connection among the first conductive lines 1011~101m and the sensor 106 controls the control unit 144 to disconnect the connection among the second conductive lines 1021~102n. Next, the sensor 105 and 106 sense the touch position by the capacitive touch sensing technology. Typically, there are two types of the capacitive touch sensing technology. One is self-capacitance touch sensing technology. The other is Mutual-capacitance touch sensing technology. When the self-capacitance touch sensing technology is sued, the sensor 105 and 106 send sensing signal to the first conductive lines 1011~101*m* and the second conductive lines 1021~102*n* to determine the position whose capacitance is changed. Then, the sensor 105 and 106 can calculate the touching position based on the change of the capacitance.

On the other hand, when the mutual-capacitance touch sensing technology is performed to sense the touch position, the sensor 105 and 106 send sensing signal to the first conductive lines 1011~101*m* and receives the sensing signal from the second conductive lines 1021~102*n*, or the sensor 105 and 106 send sensing signal to the second conductive lines 1021~102*n* and receives the sensing signal from the first conductive lines 1011~101*m* to determine the position whose capacitance is changed. Then, the sensor 105 and 106 can calculate the touching position based on the change of the capacitance.

On the other hand, as shown in FIG. 1A, no matter whether the self-capacitance touch sensing technology is used or the Mutual-capacitance touch sensing technology is used to sense the touch position, the sensor 105 controls the control unit 123 to disconnect the connection among the first conductive lines 1011~101*m* and controls the control unit 124 to disconnect the connection among the second conductive lines 1021~102*n*. Next, the sensor 105 senses the touch position by the capacitive touch sensing technology. In a mutual-capacitance touch sensing technology, the sensor 105 senses the capacitance generated between the first conductive lines 1011~101*m* and the second conductive lines 1021~102*n* to determine the touch position. That is, the first conductive line and the second conductive line are the two electrodes of a capacitor. Therefore, when a user does not touch the panel, the capacitance between the first conductive lines 1011~101*m* and the second conductive lines 1021~102*n* is fixed. When a user touches a position of the panel, charges located in this position are moved from the first conductive lines 1011~101*m* or the second conductive lines 1021~102*n* to the finger of the user, which changes the capacitance in this position. In this case, the sensor 105 can sense this change of the capacitance in this position to determine the position.

Moreover, in an embodiment, the first conductive lines 1011~101*m* and the second conductive lines 1021~102*n* can be grouped. The capacitance touch sensing technology is applied to these groups to determine the touch position at the same time to reduce the sensing time.

Accordingly, the dual-mode touch sensor 100 of the present invention provides two types of sensing technology, the electromagnetic touch sensing technology and the capacitive touch sensing technology, to determine the touch position. In the electromagnetic touch sensing technology, a user can use a pen with a magnetic sensing loop or a LC loop to write. In the capacitive touch sensing technology, a user can use his finger to write. That is, the present invention provides different input interface to the user to increase the input convenience. When a user touches a panel using the dual-mode touch sensor 100 of the present invention, both electromagnetic touch sensing technology and capacitive touch sensing technology are used to determine the touch position, which increase the sensing accuracy. In another embodiment, a user also can select one of the electromagnetic touch sensing technology and the capacitive touch sensing technology to determine the touch position. When both the electromagnetic touch sensing technology and the capacitive touch sensing technology are used to determine the touch position, in an embodiment, the electromagnetic touch sensing technology is performed, then, the capacitive touch sensing technology is performed to determine the touch position, or, in another embodiment, the capacitive touch sensing technology is performed, then, the electromagnetic touch sensing technology is performed to determine the touch position.

Figure 2:
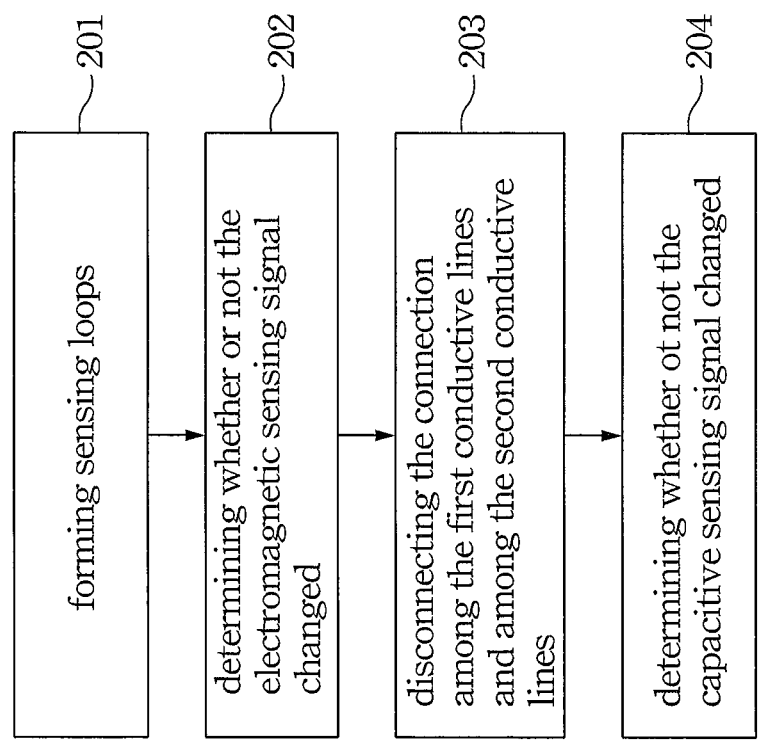
FIG. 2 illustrate a flow chart to describe the electromagnetic touch sensing technology is performed, then, the capacitive touch sensing technology is performed to determine the touch position.

FIG. 2 illustrate a flow chart to describe the electromagnetic touch sensing technology is performed, then, the capacitive touch sensing technology is performed to determine the touch position. Please refer to the FIG. 1A and FIG. 2.

In step 201, sensing loops are formed. In an embodiment, the sensor 105 controls the selective units to select some of the first conductive lines 1011~101*m* and some of the second conductive lines 1021~102*n* to form the sensing loops. The sensor 105 sends sensing signal to the sensing loops. In an embodiment, the sensing loop includes adjacent two conductive lines. In another embodiment, the sensing loop includes separated two conductive lines. In further embodiment, the sensing loop includes multi-conductive lines. Moreover, the sensing loops are formed sequentially or are formed in a same time.

In step 202, the sensor detects the sensing loops to determine whether or not the sensing signal in the detected loops is changed. In an embodiment, the sensor 105 sends a sensing signal to the sensing loop and receives the sensing signal to determine whether or not the sensing signal in the detected loops is changed. The sensor 105 can determine whether or not the magnetic flux, electromagnetic induction, current or frequency is changed based on the sensing signal whether or not is changed. In an embodiment, the sensing signal is a square wave signal, a triangle wave signal, a like-triangle wave signal or a wave signal composed of a plurality of square wave signals. The change of the sensing signal includes the distorted of the wave, the change of the average value of the signal, the change of the peak value of the signal, the change of the current or the change of the voltage.

Next, the capacitive touch sensing technology is performed. In step 203, the sensor 105 controls the control unit 123 to disconnect the connection among the first conductive lines 1011~101*m* and controls the control unit 124 to disconnect the connection among the second conductive lines 1021~102*n*.

In step 204, the sensor 105 senses the touch position by the capacitive touch sensing technology. In an embodiment, when a mutual-capacitance touch sensing technology is used to sense the touch position, the sensor 105 senses the capacitance generated between the first conductive lines 1011~101*m* and the second conductive lines 1021~102*n* to determine the touch position. That is, the first conductive line and the second conductive line are the two electrodes of a capacitor. Therefore, when a user touches a position of the panel, charges located in this position are moved from the first conductive lines 1011~101*m* or the second conductive lines 1021~102*n* to the finger of the user, which changes the capacitance in this position. In this case, the sensor 105 can sense this change of the capacitance to determine the position.

Figure 3:
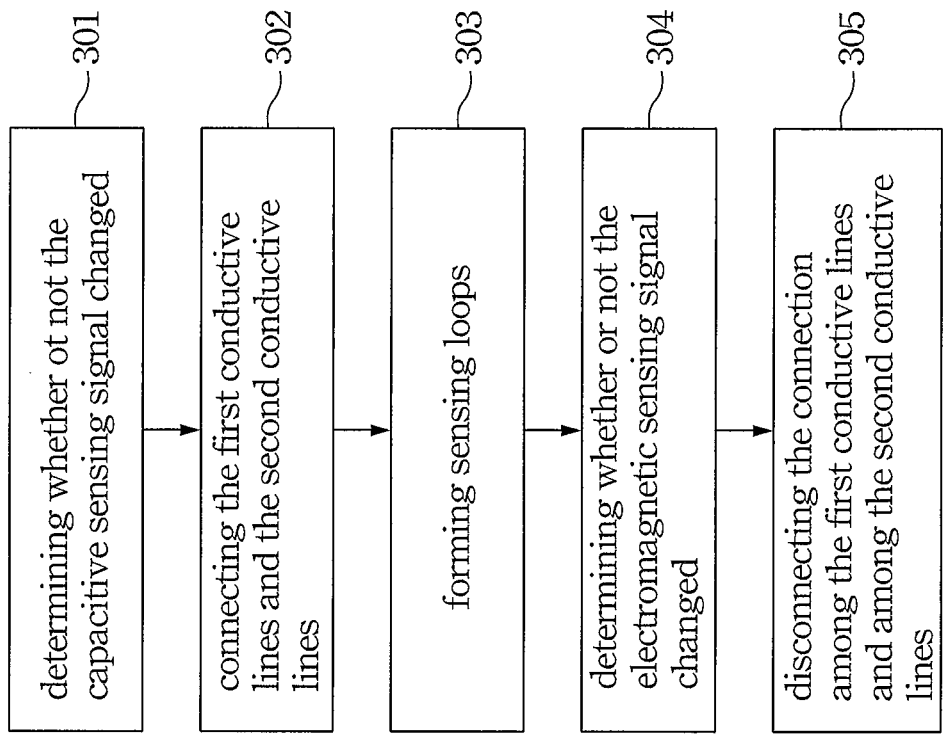
FIG. 3 illustrate a flow chart to describe the capacitive touch sensing technology is performed, then, the electromagnetic touch sensing technology is performed to determine the touch position.

On the other hand, FIG. 3 illustrate a flow chart to describe the capacitive touch sensing technology is performed, then, the electromagnetic touch sensing technology is performed to determine the touch position, Please refer to the FIG. 1A and FIG. 3.

In step 301, the sensor 105 senses the touch position by the capacitive touch sensing technology. In an embodiment, when a mutual-capacitance touch sensing technology is used to sense the touch position, the sensor 105 senses the capacitance generated between the first conductive lines 1011~101*m* and the second conductive lines 1021~102*n* to determine the touch position. That is, the first conductive line and the second conductive line are the two electrodes of a capacitor. Therefore, when a user touches a position of the panel, charges located in this position are moved from the first conductive lines $1011$~$101m$ or the second conductive lines $1021$~$102n$ to the finger of the user, which changes the capacitance in this position. In this case, the sensor 105 can sense this change of the capacitance to determine the position.

In step 302, the sensor controls the control unit to connect the first conductive lines $1011$~$101m$ and the second conductive lines $1021$~$102n$.

In step 303, sensing loops are formed. In an embodiment, the sensor 105 controls the selective units to select some of the first conductive lines $1011$~$101m$ and some of the second conductive lines $1021$~$102n$ to form the sensing loops. The sensor 105 sends sensing signal to the sensing loops. In an embodiment, the sensing loop includes adjacent two conductive lines. In another embodiment, the sensing loop includes separated two conductive lines. In further embodiment, the sensing loop includes multi-conductive lines. Moreover, the sensing loops are formed sequentially or are formed in a same time.

In step 304, the sensor detects the sensing loops to determine whether or not the sensing signal in the detected loops is changed. In an embodiment, the sensor 105 sends a sensing signal to the sensing loop and receives the sensing signal to determine whether or not the sensing signal in the detected loops is changed. The sensor 105 can determine whether or not the magnetic flux, electromagnetic induction, current or frequency is changed based on the sensing signal whether or not is changed. In an embodiment, the sensing signal is a square wave signal, a triangle wave signal, a like-triangle wave signal or a wave signal composed of a plurality of square wave signals. The change of the sensing signal includes the distorted of the wave, the change of the average value of the signal, the change of the peak value of the signal, the change of the current or the change of the voltage.

In step 305, the sensor 105 controls the control unit 123 to disconnect the connection among the first conductive lines $1011$~$101m$ and controls the control unit 124 to disconnect the connection among the second conductive lines $1021$~$102n$.

It is noticed that the capacitive touch sensing technology and the electromagnetic touch sensing technology are performed in different time segments. As illustrated in the FIG. 2, the electromagnetic touch sensing technology is performed in a first time segment. Two different sensing frequency, a first sensing frequency and a second sensing frequency, are used in the electromagnetic touch sensing technology. That is, the first time segment is divided into two periods, the first period and the second period. The electromagnetic touch sensing technology uses the first sensing frequency to determine the touch position in the first period. The electromagnetic touch sensing technology uses the second sensing frequency to determine the touch position in the second period. The selective units 103 and 104 select some of the first conductive lines $1011$~$101m$ and some of the second conductive lines $1021$~$102n$ to form the sensing loops. The sensor 105 performs the electromagnetic touch sensing technology to determine the touch position. Then, the capacitive touch sensing technology is performed in a second time segment. The sensor 105 senses the change of the capacitance between the first conductive lines $1011$~$101m$ and the second conductive lines $1021$~$102n$ to determine the position.

In another embodiment, the flow illustrated in FIG. 2 is performed in three different time segments. In the first time segment, the pixels in the display region are scanned to display image. In the second time segment, the electromagnetic touch sensing technology is performed. At least one sensing frequency is used in the electromagnetic touch sensing technology to determine the touch position. The selective units 103 and 104 select some of the first conductive lines $1011$~$101m$ and some of the second conductive lines $1021$~$102n$ to form the sensing loops. The sensor 105 performs the electromagnetic touch sensing technology to determine the touch position. Then, in the third time segment, the capacitive touch sensing technology is performed. The sensor 105 senses the change of the capacitance between the first conductive lines $1011$~$101m$ and the second conductive lines $1021$~$102n$ to determine the position. On the other hand, the electrode structure of a dual-mode touch sensor according to a preferred embodiment of the present invention can be integrated into the array electrode of a display panel. That is, the array electrode of a display panel can be used to serve as the electrode of the dual-mode touch sensor of the present invention.

Figure 4A:
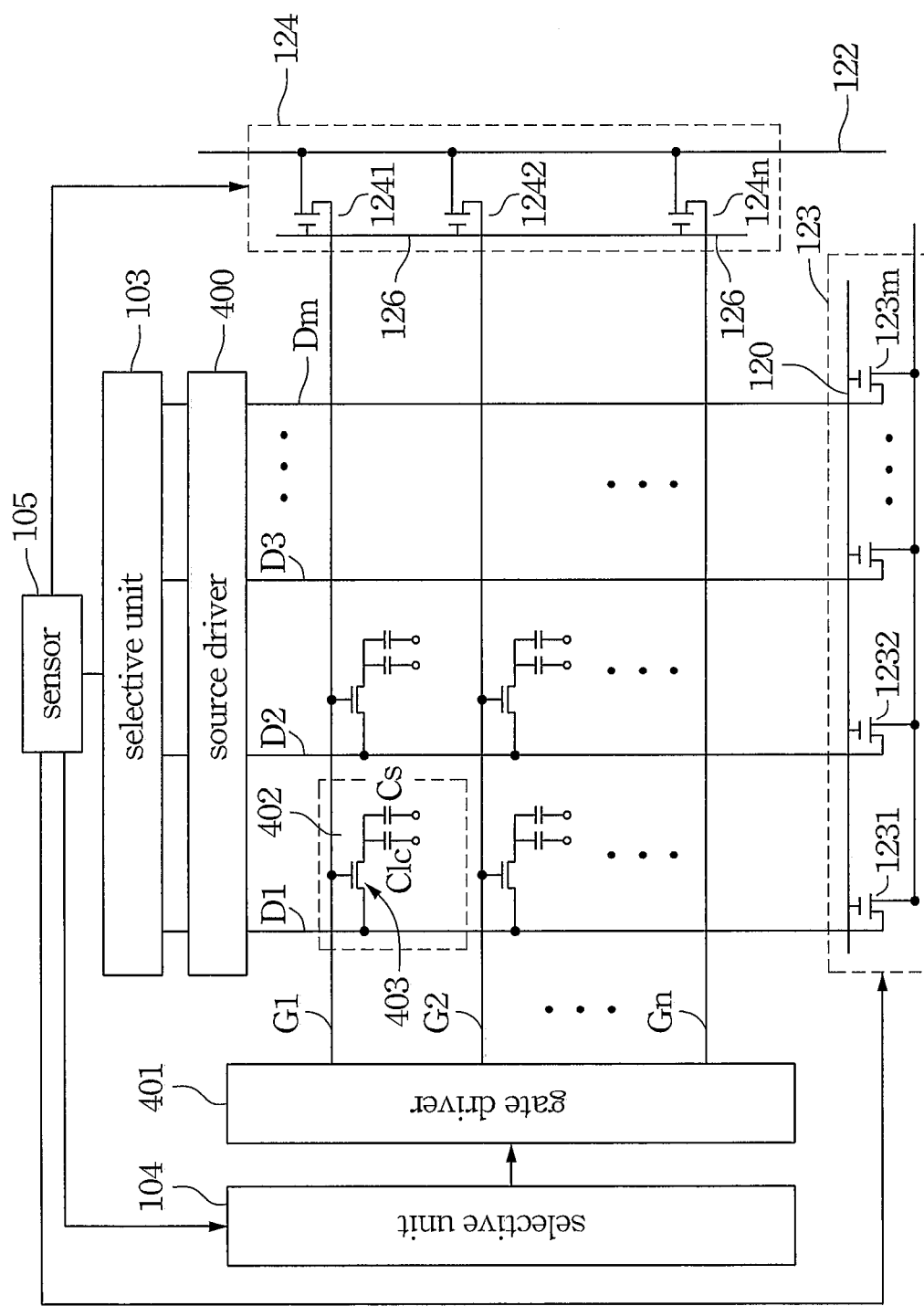
FIG. 4A illustrates an array electrode structure of a display panel according to an embodiment.

FIG. 4A illustrates an array electrode structure of a display panel according to an embodiment. The display panel is composed of a plurality of data lines D1, D2 . . . Dm and a plurality of scan lines G1, G2, . . . , Gn. The data lines cross the scan lines. Each pair of data lines and scan line controls a pixel unit. For example, the data line D1 and the scan line G1 controls a pixel unit 402. Each pixel unit 402 includes a thin film transistor 403, a storage capacitor Cs and a liquid crystal capacitor Clc that is composed of a pixel electrode and a common electrode. The gate electrode of the thin film transistor 403 is connected to the scan line G1. The drain electrode of the thin film transistor 403 is connected to the data line D1. The scan signal in the scan line may turn on the thin film transistor 403. Then, the image signal in the data line D1 is transferred to the pixel unit 402. The data lines D1, D2 . . . Dm and the scan lines G1, G2, . . . , Gn can be used to serve as the electrode of the dual-mode touch sensor of the present invention. Accordingly, it is not necessary to form additional electrodes for sensing the touch position. Therefore, the production cost is reduced and the production yield is kept.

In this embodiment, the data lines D1, D2 . . . Dm are the second conductive lines $1021$~$102n$ as shown in the FIGS. 1A and 1B. The scan lines G1, G2, . . . , Gn are the first conductive lines $1011$~$101m$ as shown in the FIGS. 1A and 1B. Accordingly, to prevent the image signal from being interfered by the sensing signal, a control unit 123 is formed between the data lines D1, D2 . . . Dm and the transmission line 120 to control the connection between the data lines D1, D2 . . . Dm and the transmission line 121. Moreover, the image signal and the sensing signal are transferred to the data lines D1, D2 . . . Dm and the scan lines G1, G2, . . . , Gn in different times. That is, when the image signal is transferred to the data lines D1, D2 . . . Dm to display, there is no any sensing signal is transferred in the data lines D1, D2 . . . Dm. Therefore, the image signal can be displayed normally.

The control unit 123 includes a control line 120, a plurality of switch $1231$~$123m$ and a transmission line 121. The control line 120 switches the switches $1231$~$123m$. The data lines D1, D2 . . . Dm are connected to the transmission line 121 through the switches $1231$~$123m$. Therefore, the data lines D1, D2 . . . Dm can be connected together through the transmission line 121. In an embodiment, the switches $1231$~$123m$ are thin film transistors (TFT). The gate electrodes of the TFTs are connected to the control line 120. When the control line 120 controls the TFTs to an off state, the connection between the data lines D1, D2 . . . Dm and the transmission line 121 is disconnected. When the control line 120 controls the TFTs to an on state, the control line 120 turns on the switches $1231$~$123m$ to make the data lines D1, D2 . . . Dm connect with the transmission line 121 to form a sensing loop to perform an electromagnetic touch sensing technology.

On the other hand, a control unit 124 is formed between the scan lines G1, G2, . . . , Gn and the transmission line 122 to control the connection between the scan lines G1, G2, . . . , Gn and the transmission line 122. The control unit 124 includes a control line 126, a plurality of switch 1241~124n and a transmission line 122. The control line 126 switches the switches 1241~124n. The scan lines G1, G2, . . . , Gn are connected to the transmission line 122 is through the switches 1241~124n. Therefore, the scan lines G1, G2, . . . , Gn can be connected together through the transmission line 122. In an embodiment, the switches 1241~124n are thin film transistors (TFT). The gate electrodes of the TFTs are connected to the control line 125. When the control line 126 controls the TFTs to an off state, the connection between the scan lines G1, G2, . . . , Gn and the transmission line 122 is disconnected. When the control line 126 controls the TFTs to an on state, the control line 126 turns on the switches 1241~124n to make the scan lines G1, G2, . . . , Gn connect with the transmission line 122 to form a sensing loop to perform an electromagnetic touch sensing technology.

When a capacitive touch sensing technology is performed, the sensor 105 controls the control unit 123 to disconnect the connection among the data lines D1, D2 . . . Dm and controls the control unit 124 to disconnect the connection among the scan lines G1, G2, . . . , Gn. Next, the sensor 105 senses the touch position. Typically, there are two types of the capacitive touch sensing technology. One is self-capacitance touch sensing technology. The other is Mutual-capacitance touch sensing technology. According to the self-capacitance touch sensing technology, the sensor 105 sends sensing signal to the data lines D1, D2 . . . Dm and the scan lines G1, G2, . . . , Gn to determine the position whose capacitance is changed. Then, the sensor 105 can calculate the touching position based on the change of the capacitance. On the other hand, when the mutual-capacitance touch sensing technology is performed to sense the touch position, the sensor 105 sends sensing signal to the data lines D1, D2 . . . Dm and receives the sensing signal from the scan lines G1, G2, . . . , Gn, or the sensor 105 sends sensing signal to the scan lines G1, G2, . . . , Gn and receives the sensing signal from the data lines D1, D2 . . . Dm to determine the position whose capacitance is changed. Then, the sensor 105 can calculate the touching position based on the change of the capacitance.

Moreover, because the data lines D1, D2 . . . Dm and the scan lines G1, G2, . . . , Gn are arranged in highly concentrated in the panel, when a user touch this panel, it is very possible for this user to touch many data lines and scan lines at same time. Such case may cause many positions whose capacitance are changed, which makes the sensor 105 can not determine the exactly touch position. For solving this problem, a plurality of data lines, such as 30 data lines, is grouped together to serve as a touch line and a plurality of scan lines G1, G2, . . . , Gn, such as 30 scan lines, is grouped together to serve as a touch line. As shown in FIG. 4A, the data lines D1~D30 are grouped together to serve as a first touch line and the data lines D31~D60 are grouped together to serve as a second touch line. The rest may be deduced by analogy. The scan lines G1~G30 are grouped together to serve as a first touch line and the scan lines G31~G60 are grouped together to serve as a second touch line. The rest may be deduced by analogy. The sensing signal is transferred to the touch line and the second touch line. In another embodiment, the grouped method is also according to the size of a finger, such as 2 mm~5 mm.

Furthermore, for forming sensing loops among the data lines D1, D2 . . . Dm and the scan lines G1, G2, . . . , Gn, two selective units 103 and 104 are formed on the display panel. The selective unit 103 includes a plurality of switches connected to corresponding data lines D1, D2 . . . Dm. The switches are selected to connect some of the data lines D1, D2 . . . Dm to form a sensing loop. The selective unit 104 also includes a plurality of switches connected to corresponding scan lines G1, G2, . . . , Gn. The switches are selected to connect some of the scan lines G1, G2, . . . , Gn, to form a sensing loop.

It is noticed that, the sensing loops can be formed by connecting two adjacent data lines D1, D2 . . . Dm and formed by connecting two adjacent scan lines G1, G2, . . . , Gn. However, in another embodiments, the sensing loops are formed by connecting separated data lines D1, D2 . . . Dm and scan lines G1, G2, . . . , Gn. For example, the sensor 105 controls the selective unit 103 to select data lines D1 and D30 to form the sensing loop. The sensing loops can be also formed by a first main line and a second main line connected with the first main line, wherein the first main line and the second main line are formed by connecting some data lines D1, D2 . . . Dm or scan lines G1, G2, . . . , Gn respectively. For example, the data lines D1~D20 are connected together through the transmission line 120 to be the first main line. The data lines D121~D140 are connected together through the transmission line 120 to be the second main line. Then, the first main line and the second main line are connected together to form a sensing loop. Accordingly, when the electromagnetic touch sensing technology is performed, the sensor 105 sends a sensing signal through the selective unit 103 to the data lines D1~D20 and receives the sensing signal through the data lines D121~D140 to determine whether or not a touching event happens in the sensing loop. The sensing loops can be formed sequentially or formed at the same time. The sensing loops can overlap to one another to prevent a "sensing miss" case. For example, a sensing loop A and a sensing loop B are formed sequentially. The sensing loop A has a first main line composed of data lines D1~D10 and a second main line composed of data lines D111~D120. The sensing loop B has a first main line composed of data lines D100~D110 and a second main line composed of data lines D211~D220. Accordingly, the sensing loop A and the sensing loop B has a overlap region composed of data lines D100~D120 to prevent a "sensing miss" case.

In an embodiment, the switches are thin film transistors or other devices with the same function as the thin film transistors. When the switches are thin film transistors, the switches can be formed on the array substrate. In another embodiment, the switches in the selective unit 103 can be integrated into the source driver 400, the switches in the selective unit 104 can be integrated into the gate driver 401.

Figure 4B:
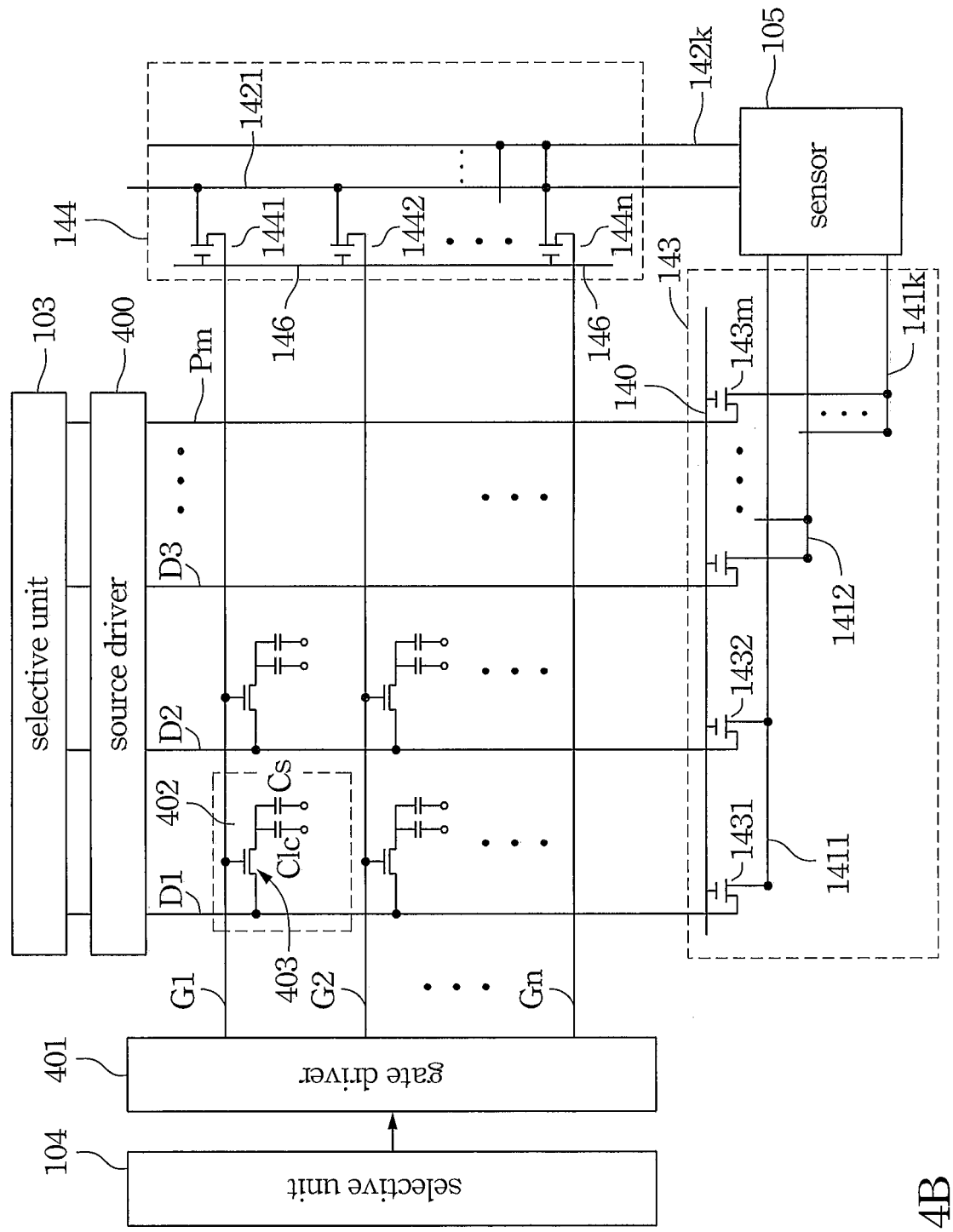
FIG. 4B illustrates an array electrode structure of a display panel according to another embodiment.

FIG. 4B illustrates an array electrode structure of a display panel according to another embodiment. According to this embodiment, the sensor 105 connects with a transmission line. The selective units 103 and 104 are controlled by the sensor 105.

The control unit 143 includes a control line 140, a plurality of switch 1431~143m and transmission lines 1411~141k. The control line 140 switches the switches 1431~143m. The data lines D1, D2 . . . Dm are connected to the transmission lines 1411~141k through the switches 1431~143m. Therefore, the data lines D1, D2 . . . Dm can be connected to the sensor 105 through the transmission lines 1411~141k. In this embodiment, data lines D1, D2 are connected to the transmission line 1411 through the switches 1431 and 1432. Therefore, the data lines D1, D2 can be connected to the sensor 105 through the transmission line 1411. Data lines D3, D4 are connected to the transmission line 1411 through the switches 1433 and 1434. Therefore, the data lines D3, D4 is can be connected to the sensor 105 through the transmission line 1412.

The sensor 105 controls the control line 140 to switch the switches 1431~143m to make the data lines D1~Dm to connect to corresponding transmission lines. The switches 1431~143m are thin film transistors (TFT). The gate electrodes of the TFTs are connected to the control line 140. When the control line 140 controls the TFTs to an off state, the connection between the data lines D1, D2 . . . Dm and the transmission line 1411~141k is disconnected. When the control line 140 controls the TFTs to an on state, the control line 140 turns on the switches 1431~143m to make the data lines D1, D2 . . . Dm connect with the transmission line 1411~141k to form a sensing loop to perform an electromagnetic touch sensing technology.

The control unit 144 includes a control line 146, a plurality of switch 1441~144n and a transmission lines 1421~142k. The control line 146 switches the switches 1441~144n. The scan lines G1, G2, . . . , Gn are connected to the transmission lines 1421~142k through the switches 1441~144n. Therefore, the scan lines G1, G2, . . . , Gn can be connected to the sensor 105 through the transmission lines 1421~142k. In this embodiment, scan lines G1, G2 are connected to the transmission line 1421 through the switches 1441 and 1442. Therefore, the Scan lines G1, G2 can be connected to the sensor 105 through the transmission line 1421. Scan lines G3, G4 are connected to the transmission line 1422 through the switches 1443 and 1444. Therefore, the scan lines G3, G4 can be connected to the sensor 105 through the transmission line 1422.

The sensor 105 controls the control line 246 to switch the switches 1441~144n to make the scan lines G1~Gn connect with corresponding transmission line to form a sensing loop to perform an electromagnetic touch sensing technology. In an embodiment, the switches 1441~144n are thin film transistors (TFT). The gate electrodes of the TFTs are connected to the control line 125. When the control line 146 controls the TFTs to an off state, the connection between the scan lines G1, G2, . . . , Gn and the transmission lines 1421~142k is disconnected. When the control line 146 controls the TFTs to an on state, the control line 146 turns on the switches 1441~144n to make the scan lines G1, G2, . . . , Gn connect with the transmission lines 1421~142k to form a sensing loop to perform an electromagnetic touch sensing technology.

When a capacitive touch sensing technology is performed, the sensor 105 controls the control unit 143 to disconnect the connection among the data lines D1, D2 . . . Dm and controls the control unit 144 to disconnect the connection among the scan lines G1, G2, . . . , Gn. Next, the sensor 105 senses the touch position. Typically, there are two types of the capacitive touch sensing technology. One is self-capacitance touch sensing technology. The other is Mutual-capacitance touch sensing technology. According to the self-capacitance touch sensing technology, the sensor 105 sends sensing signal to the data lines D1, D2 . . . Dm and the scan lines G1, G2, . . . , Gn to determine the position whose capacitance is changed. Then, the sensor 105 can calculate the touching position based on the change of the capacitance. On the other hand, when the mutual-capacitance touch sensing technology is performed to sense the touch position, the sensor 105 sends sensing signal to the data lines D1, D2 . . . Dm and receives the sensing signal from the scan lines G1, G2, . . . , Gn, or the sensor 105 sends sensing signal to the scan lines G1, G2, . . . , Gn and receives the sensing signal from the data lines D1, D2 . . . Dm to determine the position whose capacitance is changed. Then, the sensor 105 can calculate the touching position based on the change of the capacitance.

When a user touches this panel, both electromagnetic touch sensing technology and capacitive touch sensing technology are used to determine the touch position. In another embodiment, a user also can select one of the electromagnetic touch sensing technology and the capacitive touch sensing technology to determine the touch position. When both the electromagnetic touch sensing technology and the capacitive touch sensing technology are used to determine the touch position, in an embodiment, the electromagnetic touch sensing technology is performed, then, the capacitive touch sensing technology is performed to determine the touch position, or, in another embodiment, the capacitive touch sensing technology is performed, then, the electromagnetic touch sensing technology is performed to determine the touch position.

Figure 5:
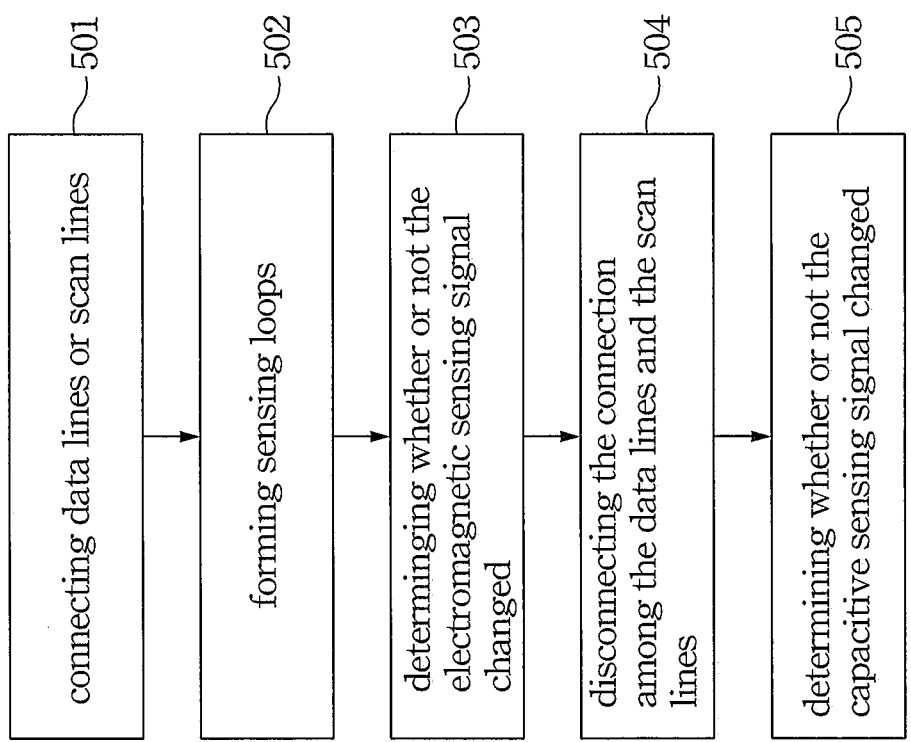
FIG. 5 illustrate a flow chart to describe the electromagnetic touch sensing technology is performed, then, the capacitive touch sensing technology is performed to determine the touch position.

FIG. 5 illustrate a flow chart to describe the electromagnetic touch sensing technology is performed, then, the capacitive touch sensing technology is performed to determine the touch position, Please refer to the FIG. 4A and FIG. 5.

In step 501, the data lines D1~Dm are connected together and the scan lines G1~Gn are connected together to perform the electromagnetic touch sensing technology. Foe preventing the image signal from being interfered by the sensing signal, a control unit 123 is formed between the data lines D1, D2 . . . Dm and the transmission line 121 to control the connection between the data lines D1, D2 . . . Dm and the transmission line 121. A control unit 124 is formed between the scan lines G1~Gn and the transmission line 122 to control the connection between the scan lines G1~Gn and the transmission line 122. The sensor 105 also connects with the selective units 103 and 104 to form sensing loops.

In step 502, sensing loops are formed. In an embodiment, the sensor 105 controls the selective units to select some of data lines D1, D2 . . . Dm and some of scan lines G1~Gn to form the sensing loops. The sensor 105 sends sensing signal to the sensing loops. In an embodiment, the sensing loop includes adjacent two data lines or scan lines. In another embodiment, the sensing loop includes separated data lines or scan lines. In further embodiment, the sensing loop includes multi-lines. Moreover, the sensing loops are formed sequentially or are formed in a same time.

In step 503, the sensor detects the sensing loops to determine whether or not the sensing signal in the detected loops is changed. In an embodiment, the sensor 105 sends a sensing signal to the sensing loop and receives the sensing signal to determine whether or not the sensing signal in the detected loops is changed. The sensor 105 can determine whether or not the magnetic flux, electromagnetic induction, current or frequency is changed based on the sensing signal whether or not is changed. In an embodiment, the sensing signal is a square wave signal, a triangle wave signal, a like-triangle wave signal or a wave signal composed of a plurality of square wave signals. The change of the sensing signal includes the distorted of the wave, the change of the average value of the signal, the change of the peak value of the signal, the change of the current or the change of the voltage.

Next, the capacitive touch sensing technology is performed. In step 504, the sensor 105 controls the control unit 123 to disconnect the connection among the data lines D1~Dm and controls the control unit 124 to disconnect the connection among the scan lines G1~Gn.

In step 505, the sensor 105 senses the touch position by the capacitive touch sensing technology. In an embodiment, when a mutual-capacitance touch sensing technology is used to sense the touch position, the sensor 105 senses the capacitance generated between the data lines D1~Dm and the scan lines G1~Gn to determine the touch position. That is, the data lines D1~Dm and the scan lines G1~Gn are the two electrodes of a capacitor. Therefore, when a user touches a position of the panel, charges located in this position are moved from the data lines D1~Dm or the scan lines G1~Gn to the finger of the user, which changes the capacitance in this position. In this case, the sensor 105 can sense this change of the capacitance to determine the position. On the other hand, when the mutual-capacitance touch sensing technology is performed to sense the touch position, the sensor 105 sends sensing signal to the data lines D1, D2 . . . Dm and receives the sensing signal from the scan lines G1, G2, . . . , Gn, or the sensor 105 sends sensing signal to the scan lines G1, G2, . . . , Gn and receives the sensing signal from the data lines D1, D2 . . . Dm to determine the position whose capacitance is changed. Then, the sensor 105 can calculate the touching position based on the change of the capacitance.

Figure 6:
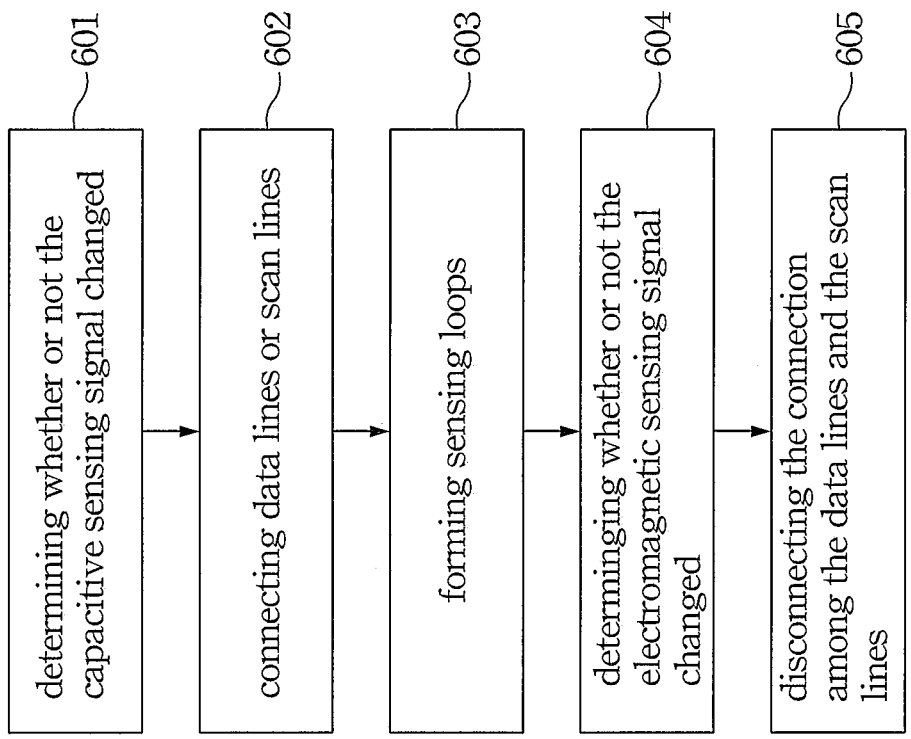
FIG. 6 illustrate a flow chart to describe the capacitive touch sensing technology is performed, then, the electromagnetic touch sensing technology is performed to determine the touch position.

On the other hand, FIG. 6 illustrate a flow chart to describe the capacitive touch sensing technology is performed, then, the electromagnetic touch sensing technology is performed to determine the touch position, Please refer to the FIG. 4A and FIG. 6.

In step 601, the sensor 105 senses the touch position by the capacitive touch sensing technology. In an embodiment, when a mutual-capacitance touch sensing technology is used to sense the touch position, the sensor 105 senses the capacitance generated between the data lines D1~Dm and the scan lines G1~Gn to determine the touch position. That is, the data lines D1~Dm and the scan lines G1~Gn are the two electrodes of a capacitor. Therefore, when a user touches a position of the panel, charges located in this position are moved from the data lines D1~Dm or the scan lines G1~Gn to the finger of the user, which changes the capacitance in this position. In this case, the sensor 105 can sense this change of the capacitance to determine the position. On the other hand, when the mutual-capacitance touch sensing technology is performed to sense the touch position, the sensor 105 sends sensing signal to the data lines D1, D2 . . . Dm and receives the sensing signal from the scan lines G1, G2, . . . , Gn, or the sensor 105 sends sensing signal to the scan lines G1, G2, . . . , Gn and receives the sensing signal from the data lines D1, D2 . . . Dm to determine the position whose capacitance is changed. Then, the sensor 105 can calculate the touching position based on the change of the capacitance.

In step 602, the data lines D1~Dm are connected together and the scan lines G1~Gn are connected together to perform the electromagnetic touch sensing technology. Foe preventing the image signal from being interfered by the sensing signal, a control unit 123 is formed between the data lines D1, D2 . . . Dm and the transmission line 121 to control the connection between the data lines D1, D2 . . . Dm and the transmission line 121. A control unit 124 is formed between the scan lines G1~Gn and the transmission line 122 to control the connection between the scan lines G1~Gn and the transmission line 122. The sensor 105 also connects with the selective units 103 and 104 to form sensing loops.

In step 603, sensing loops are formed. In an embodiment, the sensor 105 controls the selective units to select some of data lines D1, D2 . . . Dm and some of scan lines G1~Gn to form the sensing loops. The sensor 105 sends sensing signal to the sensing loops. In an embodiment, the sensing loop includes adjacent two data lines or scan lines. In another embodiment, the sensing loop includes separated data lines or scan lines. In further embodiment, the sensing loop includes multi-lines. Moreover, the sensing loops are formed sequentially or are formed in a same time.

In step 604, the sensor detects the sensing loops to determine whether or not the sensing signal in the detected loops is changed. In an embodiment, the sensor 105 sends a sensing signal to the sensing loop and receives the sensing signal to determine whether or not the sensing signal in the detected loops is changed. The sensor 105 can determine whether or not the magnetic flux, electromagnetic induction, current or frequency is changed based on the sensing signal whether or not is changed. In an embodiment, the sensing signal is a square wave signal, a triangle wave signal, a like-triangle wave signal or a wave signal composed of a plurality of square wave signals. The change of the sensing signal includes the distorted of the wave, the change of the average value of the signal, the change of the peak value of the signal, the change of the current or the change of the voltage.

In step 605, the sensor 105 controls the control unit 123 to disconnect the connection among the data lines D1~Dm and controls the control unit 124 to disconnect the connection among the scan lines G1~Gn.

It is noticed that the capacitive touch sensing technology and the electromagnetic touch sensing technology are performed in different time segments. As illustrated in the FIG. 5, the electromagnetic touch sensing technology is performed in a first time segment. Two different sensing frequency, a first sensing frequency and a second sensing frequency, are used in the electromagnetic touch sensing technology. That is, the first time segment is divided into two periods, the first period and the second period. The electromagnetic touch sensing technology uses the first sensing frequency to determine the touch position in the first period. The electromagnetic touch sensing technology uses the second sensing frequency to determine the touch position in the second period. The selective units 103 and 104 select some of the data lines D1~Dm and some of the scan lines G1~Gn to form the sensing loops. The sensor 105 performs the electromagnetic touch sensing technology to determine the touch position. Then, the capacitive touch sensing technology is performed in a second time segment. The sensor 105 senses the change of the capacitance between the data lines D1~Dm and the scan lines G1~Gn to determine the position.

In another embodiment, the flow illustrated in FIG. 5 is performed in three different time segments. In the first time segment, the pixels in the display region are scanned to display image. In the second time segment, the electromagnetic touch sensing technology is performed. At least one sensing frequency is used in the electromagnetic touch sensing technology to determine the touch position. The selective units 103 and 104 select some of the data lines D1~Dm and some of the scan lines G1'~Gn to form the sensing loops. The sensor 105 performs the electromagnetic touch sensing technology to determine the touch position. Then, in the third time segment, the capacitive touch sensing technology is performed. The sensor 105 senses the change of the capacitance between data lines D1~Dm and the scan lines G1~Gn to determine the position.

Moreover, for preventing the image signal from being interfered by the sensing signal, the sensing signal transferred and received is based on timing of lighting the backlight module. In an embodiment, a frame is divided into three time segments, a first time segment, a second time segment and a third time segment. In the first time segment, the backlight module is lighted to display an image. In the second time segment, the backlight module is turned off or turned dark to perform the electromagnetic touch sensing technology to determine the touch position. In the third time segment, the backlight module is kept in an off state to perform the capacitive touch sensing technology to determine the touch position.

Figure 7:
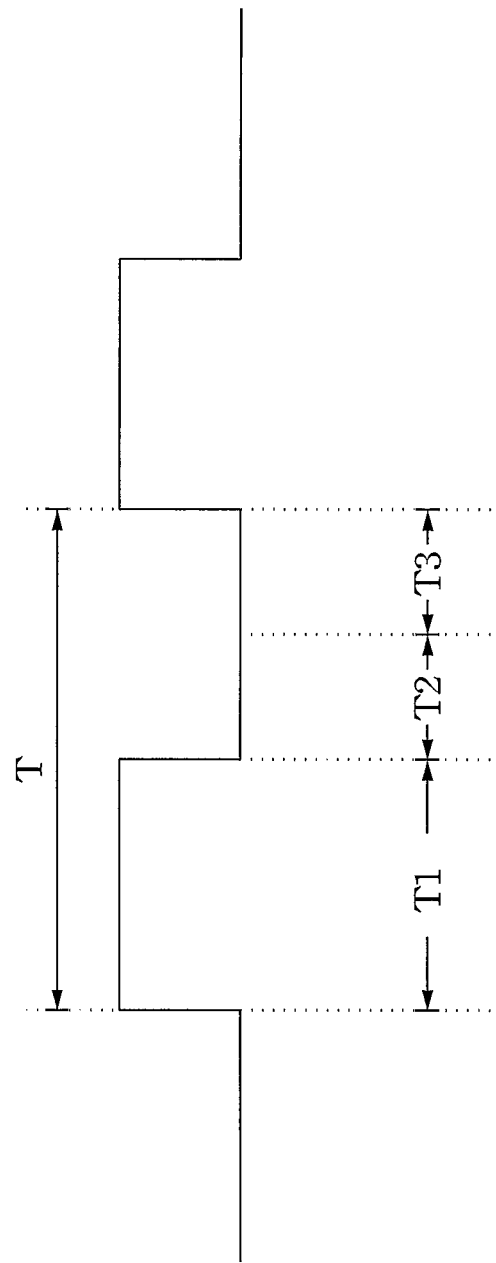
FIG. 7 illustrates a frame that is divided into three time segments, T1, T2 and T3.

FIG. 7 illustrates a frame that is divided into three time segments, T1, T2 and T3. In the first time segment T1, the backlight module is lighted to display an image. In the second time segment T2, the backlight module is turned off or turned dark to perform the electromagnetic touch sensing technology to determine the touch position. In the third time segment T3, the backlight module is kept in an off state to perform the capacitive touch sensing technology to determine the touch position. Accordingly, both the electromagnetic touch sensing technology and the capacitive touch sensing technology are performed in the time segments that the backlight module is turned off or turned dark, which can prevent the image signal from being interfered by the sensing signal. In another embodiment, the capacitive touch sensing technology can be performed in the second time segment T2. The electromagnetic touch sensing technology is performed in the third time segment T3.

Figure 9:
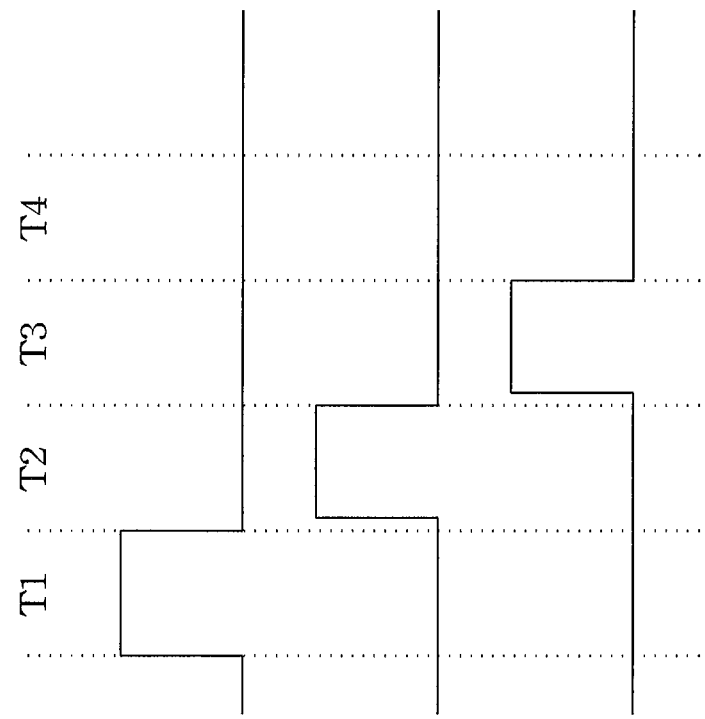
FIG. 9 illustrates a time chart for lighting the backlight module.
Figure 8:
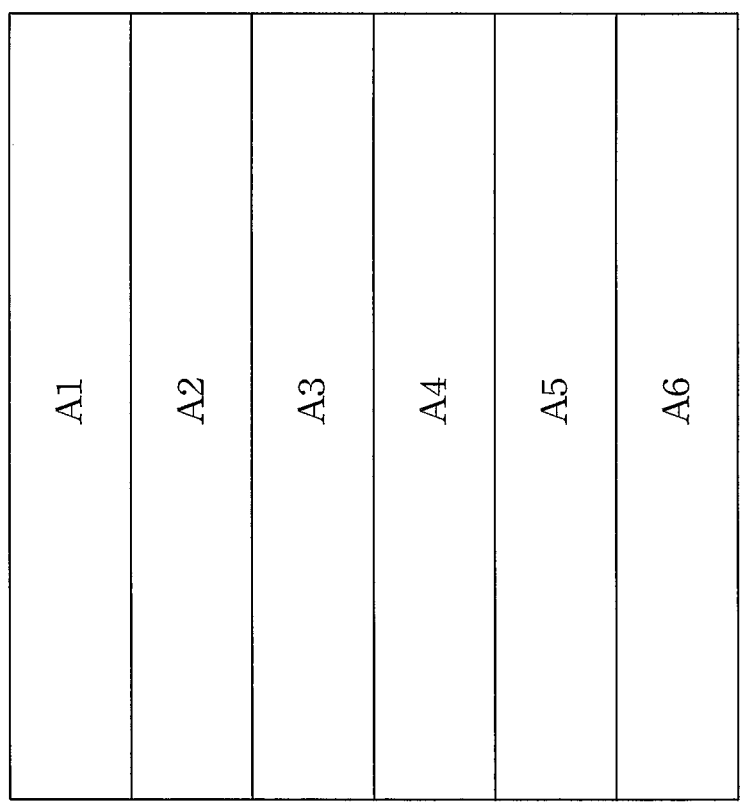
FIG. 8 illustrates a panel that is divided into six regions, region A1, region A2, region A3, region A4, region A5 and region A6.

FIG. 8 illustrates a panel that is divided into six regions, region A1, region A2, region A3, region A4, region A5 and region A6. In this embodiment, the backlight module is lighted sequentially following the six regions. FIG. 9 illustrates a time chart for lighting the backlight module. In the first time segment T1, the backlight module is lighted to display an image of region A1. In the second time segment T2, the backlight module is lighted to display an image of region A2. The rest may be deduced by analogy. Accordingly, when the region A1 is displayed in the first time segment, the electromagnetic touch sensing technology or the capacitive touch sensing technology can be performed in one of region A2, region A3, region A4, region A5 and region A6. In other words, the electromagnetic touch sensing technology or the capacitive touch sensing technology is performed in a region whose backlight module is not lighted. In an embodiment, the order to light the backlight module is from region A1, region A2, region A3, region A4, region A5 to region A6, then, the order to sense the touch position is from region A3, region A4, region A5, region A6, region A1 to region A2, or from region A4, region A5, region A6, region A1, region A2 to region A3. other sensing order also can be used in the present invention.

The dual-mode touch sensor of the present invention can be formed in different position in the display. FIG. 10 illustrates a cross section view of a display with the dual-mode touch sensor according to an embodiment of the present invention. The display 1000 includes a first substrate 1001, a color filter 1002, a common electrode layer 1003, a liquid crystal molecule layer 1004, a pixel layer 1005, a second substrate 1006 and a polarizer 1007 over the second substrate 1006. The liquid crystal molecule layer 1004 is located between the first substrate 1001 and the second substrate 1006. The common electrode layer 1003 is formed in the second substrate 1006. The pixel layer 1005 is formed in the first substrate 1001. The structure of the pixel layer 1005 is a slit ITO pixel structure. In this embodiment, the dual-mode touch sensor 100 is located between the second substrate 1006 and the polarizer 1007. In another embodiment, the dual-mode touch sensor 100 is located inside of the second substrate 1006. In another embodiment, the dual-mode touch sensor 100 is integrated into the polarizer 1007. In another embodiment, the dual-mode touch sensor 100 is located over the common electrode layer 1003.

Moreover, an additional polarizer 1011 can be formed in the first substrate 1001. The backlight module 1010 is disposed under the first substrate 1001.

Moreover, in this embodiment, the common electrode layer 1003 is formed in the second substrate 1006. The pixel layer 1005 is formed in the first substrate 1001. However, in another embodiment, the common electrode layer 1003 is formed in the first substrate 1001. The pixel layer 1005 is formed in the second substrate 1006. In further embodiment, both the common electrode layer 1003 and the pixel layer 1005 are formed in the first substrate 1001. The structure of the pixel layer 1005 is a IPS (In plan Switching) pixel structure or a FFS (Fringe Field Switching) pixel structure.

Moreover, in an embodiment, the dual-mode touch sensor 100 is integrated into the pixie layer 1005. That is, the data lines and the scan lines of the pixel layer are used to serve as the sensing electrodes of the dual-mode touch sensor.

In another embodiment, a Cover Lens is formed over the second substrate 1006. The dual-mode touch sensor 100 is disposed over the cover lens or disposed inside the cover lens.

FIG. 11 illustrates a cross section view of a display with the dual-mode touch sensor according to another embodiment of the present invention. The display 1100 includes a first substrate 1102, a pixel layer 1103, a common electrode layer 1104, a liquid crystal molecule layer 1105, a color filter 1106, a second substrate 1107 and a polarizer 1108 over the second substrate 1107. The liquid crystal molecule layer 1104 is located between the first substrate 1102 and the second substrate 1107. The common electrode layer 1104 and the pixel layer 1103 are formed in the first substrate 1102. The structure of the pixel layer 1103 is a IPS (In plan Switching) pixel structure or a FFS (Fringe Field Switching) pixel structure. In this embodiment, the dual-mode touch sensor 100 is located between the second substrate 1107 and the polarizer 1108. In another embodiment, the dual-mode touch sensor 100 is located under of the second substrate 1107. In another embodiment, the dual-mode touch sensor 100 is the color filter 1106. In another embodiment, the dual-mode touch sensor 100 is located over the common electrode layer 1105.

Moreover, an additional polarizer 1101 can be formed in the first substrate 1102. The backlight module 1110 is disposed under the first substrate 1102.

Moreover, in an embodiment, the dual-mode touch sensor 100 is integrated into the pixel layer 1103. That is, the data lines and the scan lines of the pixel layer are used to serve as the sensing electrodes of the dual-mode touch sensor.

In another embodiment, a Cover Lens is formed over the second substrate 1107. The dual-mode touch sensor 100 is disposed over the cover lens or disposed inside the cover lens.

It is noticed that the display is a transmissive-mode LCD, a reflective-mode LCD or a dual-mode transflective or partially reflective LCD.

Figure 12:
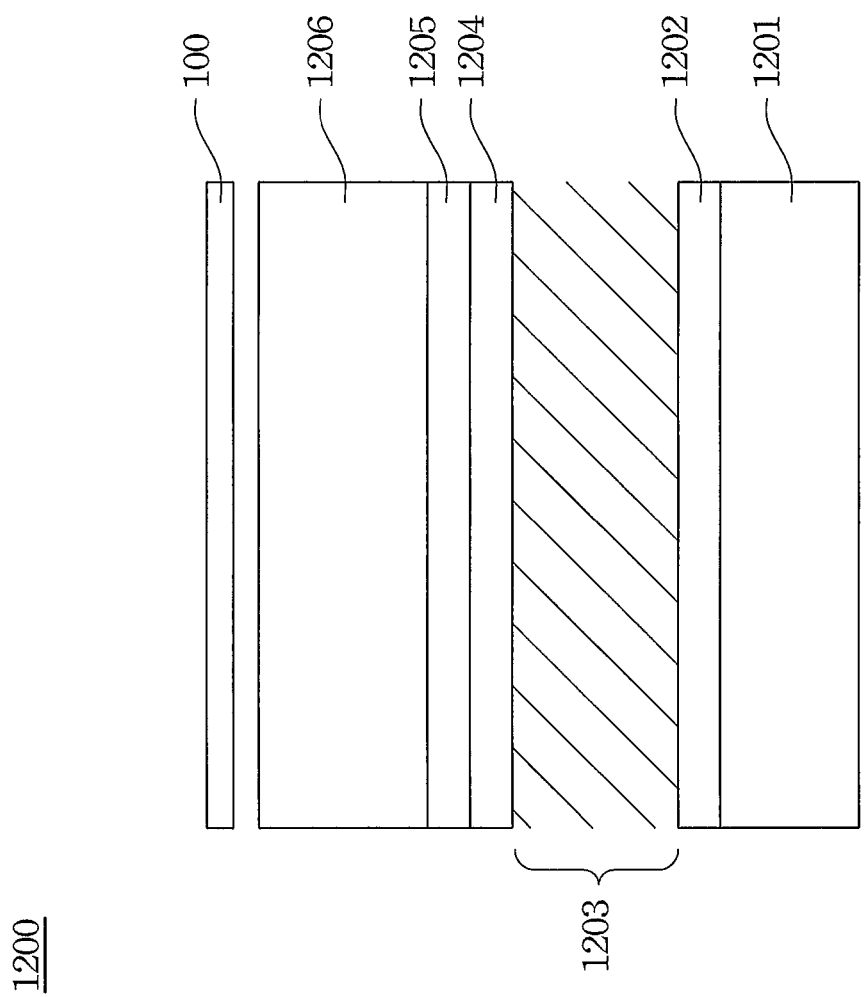
FIG. 12 illustrates a cross section view of an Organic Light Emitting display with the dual-mode touch sensor according to an embodiment of the present invention.

Moreover, the dual-mode touch sensor 100 also can be used in an Organic Light Emitting Display. FIG. 12 illustrates a cross section view of a Organic Light Emitting Display with the dual-mode touch sensor according to another embodiment of the present invention. The Organic Light Emitting Display 1200 includes a first substrate 1201, a first electrode 1201, an organic Light Emitting unit 1203, a second electrode 1204, a protection layer 1205 and a second substrate 1206. In this embodiment, the dual-mode touch sensor 100 is located on the second substrate 1206, or located between the second substrate 1206 and the protection layer 1205.

In another embodiment, a Cover Lens is formed over the second substrate 1206. The dual-mode touch sensor 100 is disposed over the cover lens or disposed inside the cover lens.

Accordingly, the dual-mode touch sensor 100 includes the data lines, the scan lines, the power lines, the Bias lines, the common electrode lines, the reading lines and the control lines.

Accordingly, the dual-mode touch sensor of the present invention provides two types of sensing technology, the electromagnetic touch sensing technology and the capacitive touch sensing technology, to determine the touch position. In the electromagnetic touch sensing technology, a user can use a pen with a magnetic sensing loop or a LC loop to write. In the capacitive touch sensing technology, a user can use his finger to write. That is, the present invention provides different input interface to the user to increase the input convenience. Moreover, the data lines D1, D2 . . . Dm and the scan lines G1, G2, . . . , Gn can be used to serve as the electrode of the dual-mode touch sensor of the present invention. Accordingly, it is not necessary to form additional electrodes for sensing the touch position. Therefore, the production cost is reduced and the production yield is kept.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A dual-mode touch sensing apparatus, comprising:
a sensor;
a first selective unit coupling with the sensor;
a second selective unit coupling with the sensor;
a first control unit coupling with the sensor;
a second control unit coupling with the sensor;
a plurality of first conductive lines arranged in parallel to each other and in a first direction, each of the first conductive lines has a first end and a second end, the first end of each of the first conductive lines couples with the first control unit, the second end of each of the first conductive lines couples with the first selective unit; and
a plurality of second conductive lines arranged in parallel to each other and in a second direction, each of the second conductive lines has a first end and a second end, the first end of each of the second conductive lines couples with the second control unit, the second end of each of the second conductive lines couples with the second selective unit,
wherein when the dual-mode touch sensing apparatus performs an electromagnetic touch sensing technology, further comprising:
the first control unit connects the first end of each of the first conductive lines to a first transmission line and the first selective unit sequentially connects the second ends of the first conductive lines based on an order to form sensing loops in the first direction, and the second control unit connects the first end of each of the second conductive lines to a second transmission line, the second selective unit sequentially connects the second end of the second conductive lines based on an order to form sensing loops in the second direction, further comprising:
grouping the first conductive lines and the second conductive lines, wherein each group includes at least two first conductive lines, or at least two second conductive lines;
the first selective unit sequentially connects the second ends of the first conductive lines in each group based on the order to form sensing loops in the first direction;
the second selective unit sequentially connects the second end of the second conductive lines in each group based on the order to form sensing loops in the second direction;
transferring a sensing signal to the sensing loops; and
performing a first sensing method to sense at least one of magnetic flux, electromagnetic induction, current, voltage or frequency of sensing loops to determine at least one of distance, height, strength, the touch position, or the touch strength,
wherein when the dual-mode touch sensing apparatus performs a capacitive touch sensing technology, the first control unit disconnects the connection between the first end of each of the first conductive lines and a first transmission line, and the second control unit disconnects the connection between the first end of each of the second conductive lines and a second transmission line, and a second sensing method is performed to sense at least one of capacitance, current, or voltage to determine at least one of distance, height, strength, a touch position or a touch strength.

2. The dual-mode touch sensing apparatus of claim 1, wherein the first sensing method is to transfer a sensing signal with a special frequency to the sensing loops to sense at least one of magnetic flux, electromagnetic induction, current, voltage, or frequency of the sensing loops, wherein the sensor determines whether at least one of magnetic flux, electromagnetic induction, current, or frequency of the sensing loops is changed.

3. The dual-mode touch sensing apparatus of claim 1, further comprising:
grouping the first conductive lines and the second conductive lines, wherein each group includes at least two first conductive lines, or at least two second conductive lines;
transferring a sensing signal to each group; and
performing the second sensing method to sense at least one of capacitance, current, or voltage to determine at least one of a touch position, or a touch strength of each group to determine at least one of distance, height, strength, the touch position, or the touch strength.

4. The dual-mode touch sensing apparatus of claim 1, wherein the second sensing method comprises the sensor transferring a sensing signal through the first selective unit to the first conductive lines, and transferring a sensing signal through the second selective unit to the second conductive lines to sense a change of at least one of the capacitance, current, or voltage of the first conductive lines and the second conductive lines to determine at least one of distance, height, strength, the touch position, or the touch strength.

5. The dual-mode touch sensing apparatus of claim 1, wherein the second sensing method comprises the sensor transferring a sensing signal through the first selective unit to the first conductive lines, and then through the second selective unit to sequentially sense at least one of the capacitance, current, or voltage of the second conductive lines to determine at least one of distance, height, strength, the touch position, or the touch strength.

6. The dual-mode touch sensing apparatus of claim 1, wherein the first control unit includes a control line and a plurality of switches or a plurality of switches in series coupling with the first conductive lines, wherein the sensor controls the control line to turn on the switches to make the first end of each of the first conductive lines connect to a first transmission line, and the sensor controls the control line to turn off the switches to disconnect the connection between the first end of each of the first conductive lines and the first transmission line.

7. The dual-mode touch sensing apparatus of claim 1, wherein the second control unit includes a control line and a plurality of switches or a plurality of switches in series coupling with the second conductive lines, wherein the sensor controls the control line to turn on the switches to make the first end of each of the second conductive lines connect to a second transmission line, and the sensor controls the control line to turn off the switches to disconnect the connection between the first end of each of the second conductive lines and the second transmission line.

8. The dual-mode touch sensing apparatus of claim 1, wherein the first selective unit includes a plurality of switches coupling with the first conductive lines respectively, and the second selective unit includes a plurality of switches coupling with the second conductive lines respectively, wherein the sensor transfers the sensing signal to loops through the first selective unit and the second selective unit to perform an electromagnetic touch sensing technology.

9. The dual-mode touch sensing apparatus of claim 1, wherein the first selective unit and the second selective unit can be integrated into a gate driver, a source driver, a timing control IC, a sensor circuit in a display, or any combination thereof.

10. The dual-mode touch sensing apparatus of claim 1, wherein the sensor has a first sensing circuit and a second sensing circuit, the first sensing circuit performing an electromagnetic touch sensing technology and the second sensing circuit performing an capacitive touch sensing technology.

11. A display with a dual-mode touch sensing apparatus of claim 1, further comprising:
   a first substrate with a pixel array;
   a second substrate;
   a display unit located between the first substrate and the second substrate; and
   a common electrode layer.

12. The display of claim 11, further comprising a cover lens located over the second substrate, wherein the dual-mode touch sensing apparatus is disposed inside or outside of the cover lens, or the dual-mode touch sensing apparatus is disposed between the cover lens and the second substrate.

13. The display of claim 11, wherein at least one of the first conductive lines or the second conductive lines includes data lines, scan lines, power lines, Bias lines, common electrode lines, reading lines and control lines of the display.

14. The display of claim 11, wherein the first conductive lines and the second conductive lines includes at least one line that is designated or modified from data lines, scan lines, power lines, Bias lines, common electrode lines, reading lines and control lines of the display.

15. The display of claim 11, wherein the display is one of an Organic Light Emitting Display, a thin film transistor liquid crystal display, an Electrode Wetting display or an electrophoretic display.

16. The display of claim 11, wherein the pixel array is one of a transmissive-mode pixel array, a reflective-mode pixel array, a dual-mode transflective or partially reflective pixel array.

17. The display of claim 11, wherein the dual-mode touch sensing apparatus is at least one of disposed inside or outside of the second substrate; disposed between the common electrode and the second substrate; or disposed on the first substrate.

18. The display of claim 11, wherein the common electrode is disposed on the first substrate and the pixel array is an IPS (In Plane Switching) pixel structure or a FFS (Fringe Field Switching) pixel structure.

19. The display of claim 11, wherein the common electrode is disposed on the second substrate and the pixel array is a Slit ITO pixel structure.

20. The display of claim 11, wherein the display further comprises a backlight module, the dual-mode touch sensing apparatus is operated when the backlight module is turned off or turned dark.

21. The display of claim 11, wherein the display further comprises a backlight module, the display is divided into a plurality of regions to display an image, when one of the regions whose backlight module is turned off or turned dark, the dual-mode touch sensing apparatus is operated in this region.

* * * * *